(12) United States Patent
Hammarwall

(10) Patent No.: US 11,563,548 B2
(45) Date of Patent: *Jan. 24, 2023

(54) METHODS AND ARRANGEMENTS FOR CSI REPORTING

(71) Applicant: Telefonaktiebolaget LM Ericsson (publ), Stockholm (SE)

(72) Inventor: David Hammarwall, Vallentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/411,519

(22) Filed: Aug. 25, 2021

(65) Prior Publication Data

US 2021/0385047 A1 Dec. 9, 2021

Related U.S. Application Data

(63) Continuation of application No. 15/653,975, filed on Jul. 19, 2017, now Pat. No. 11,121,844, which is a
(Continued)

(51) Int. Cl.
*H04L 5/00* (2006.01)
*H04L 1/00* (2006.01)
(Continued)

(52) U.S. Cl.
CPC ......... *H04L 5/0057* (2013.01); *H04B 7/0626* (2013.01); *H04J 11/0053* (2013.01);
(Continued)

(58) Field of Classification Search
CPC ......... H05L 5/0057; H04B 7/06; H04W 72/04
See application file for complete search history.

(56) References Cited

U.S. PATENT DOCUMENTS

2011/0249578 A1 10/2011 Nayeb Nazar et al.
2012/0082042 A1 4/2012 Luntilla et al.
(Continued)

FOREIGN PATENT DOCUMENTS

CN 102300244 A 12/2011
CN 102368697 A 3/2012
(Continued)

OTHER PUBLICATIONS

LG Electronics, "Consideration on CoMP CSI feedback", 3GPP TSG RAN WG1 Meeting #68b, Jeju, Korea, Mar. 26, 2012, pp. 1-4, R1-121440, 3GPP.
(Continued)

*Primary Examiner* — Sulaiman Nooristany
(74) *Attorney, Agent, or Firm* — Coats & Bennett, PLLC

(57) ABSTRACT

A method in a wireless device for reporting Channel State Information (CSI). The wireless device is comprised in a wireless communications system. The method includes receiving a CSI process configuration and a request for CSI information from a network node. The method further includes reporting CSI for one or more CSI processes. The CSI reflects the state of the channel for a CSI reference resource. According to the method, the CSI reference resource is determined based on the number of configured CSI processes. Related devices are also disclosed.

19 Claims, 17 Drawing Sheets

Method in wireless device

Related U.S. Application Data continuation of application No. 15/201,183, filed on Jul. 1, 2016, now Pat. No. 9,749,111, which is a continuation of application No. 13/991,306, filed as application No. PCT/SE2013/050518 on May 8, 2013, now Pat. No. 9,385,852.

(60) Provisional application No. 61/645,500, filed on May 10, 2012.

(51) Int. Cl.

| | | |
|---|---|---|
| *H04J 11/00* | (2006.01) | |
| *H04B 7/06* | (2006.01) | |
| *H04B 7/0417* | (2017.01) | |
| *H04L 25/02* | (2006.01) | |
| *H04L 25/03* | (2006.01) | |

(52) U.S. Cl.
CPC .......... *H04L 1/0026* (2013.01); *H04L 1/0028* (2013.01); *H04B 7/0417* (2013.01); *H04B 7/063* (2013.01); *H04B 7/0639* (2013.01); *H04L 5/001* (2013.01); *H04L 25/0204* (2013.01); *H04L 25/03898* (2013.01)

(56) References Cited

U.S. PATENT DOCUMENTS

| | | | |
|---|---|---|---|
| 2012/0082049 A1 | 4/2012 | Chen et al. | |
| 2012/0140649 A1 | 7/2012 | Choudhury et al. | |
| 2012/0287875 A1 | 11/2012 | Kim et al. | |
| 2013/0258965 A1* | 10/2013 | Geirhofer | H04W 72/048 370/329 |
| 2013/0301465 A1* | 11/2013 | Seo | H04B 17/345 370/252 |
| 2014/0355468 A1 | 12/2014 | Li et al. | |
| 2015/0124717 A1 | 5/2015 | Li et al. | |

FOREIGN PATENT DOCUMENTS

| | | |
|---|---|---|
| CN | 107317646 A | 11/2017 |
| CN | 107317646 B | 10/2019 |
| WO | 2011115421 A2 | 9/2011 |

OTHER PUBLICATIONS

Renesas Mobile Europe Ltd., "Size of CoMP measurement set", 3GPP TSG RAN WG1 Meeting #68b, Jeju, Korea, Mar. 26, 2012, pp. 1-5, R1-121386, 3GPP.

Renesas Mobile Europe Ltd., CoMP set management, 3GPP TSG-RAN WG1 Meeting #68, Dresden, DE, Feb. 6, 2012, pp. 1-7, R1-120378, 3GPP.

Ericsson et al., "Implicit CSI Feedback Framework for DL CoMP", 3GPP TSG RAN WG1 Meeting #68b, Jeju, Korea, Mar. 26, 2012, pp. 1-7, R1-121739, 3GPP.

Ericsson et al., "CQI Definition of UE Emulated Intra CoMP Cluster Interference", 3GPP TSG RAN WG1 Meeting #68bis, Jeju, Korea, Mar. 26, 2012, pp. 1-3, R1-121740, 3GPP.

Ericsson et al., "Interference Measurements for CoMP CSI Reporting", 3GPP TSG RAN WG1 Meeting #68bis, Jeju, Korea, Mar. 26, 2012, pp. 1-2, R1-121741, 3GPP.

3rd Generation Partnership Project, "3rd Generation Partnership Project; Technical Specification Group Radio Access Network; Evolved Universal Terrestrial Radio Access (E-UTRA); Physical layer procedures (Release 10)", Technical Specification, 3GPP TS 36.213 V10.5.0, Mar. 1, 2012, pp. 1-125, 3GPP.

CMCC. "Discussion on the CQI reporting for Rel-10." 3GPP TSG RAN WG1 #64, Taibei, Feb. 21-25, 2011, pp. 1-5, R1-110965. 3GPP.

Renesas Mobile Europe Ltd., "Downlink control signaling for CoMP", 3GPP TSG-RAN WG1 Meeting #68bis, Jeju, Korea, Mar. 26, 2012 pp. 1-4, R1-121395, 3GPP.

NTT DOCOMO; "Enhanced Interference Measurement Mechanism for Rel-11"; 3GPP TSG RAN WG1 Meeting #68; R1-120405; Dresden, Germany; Feb. 6-10, 2012; pp. 1-7.

3rd Generation Partnership Project, "3rd Generation Partnership Project; Technical Specification Group Radio Access Network; Coordinated Multi-Point Operation for LTE Physical Layer Aspects (Release 11)", Technical Report, 3GPP TR 36.819 V11.1.0, Dec. 1, 2011, pp. 1-69, 3GPP.

Ericsson et al., "CSI Feedback for DL CoMP", 3GPP TSG-RAN WG1 #67, San Francisco, USA, Nov. 14, 2011, pp. 1-4, R1-114258, 3GPP.

Huawei et al., "Resource-Restricted Measurements for CoMP Feedback", 3GPP TSG RAN WG1 Meeting #68bis, Jeju, Korea, Mar. 26, 2012, pp. 1-3, R1-120981, 3GPP.

* cited by examiner

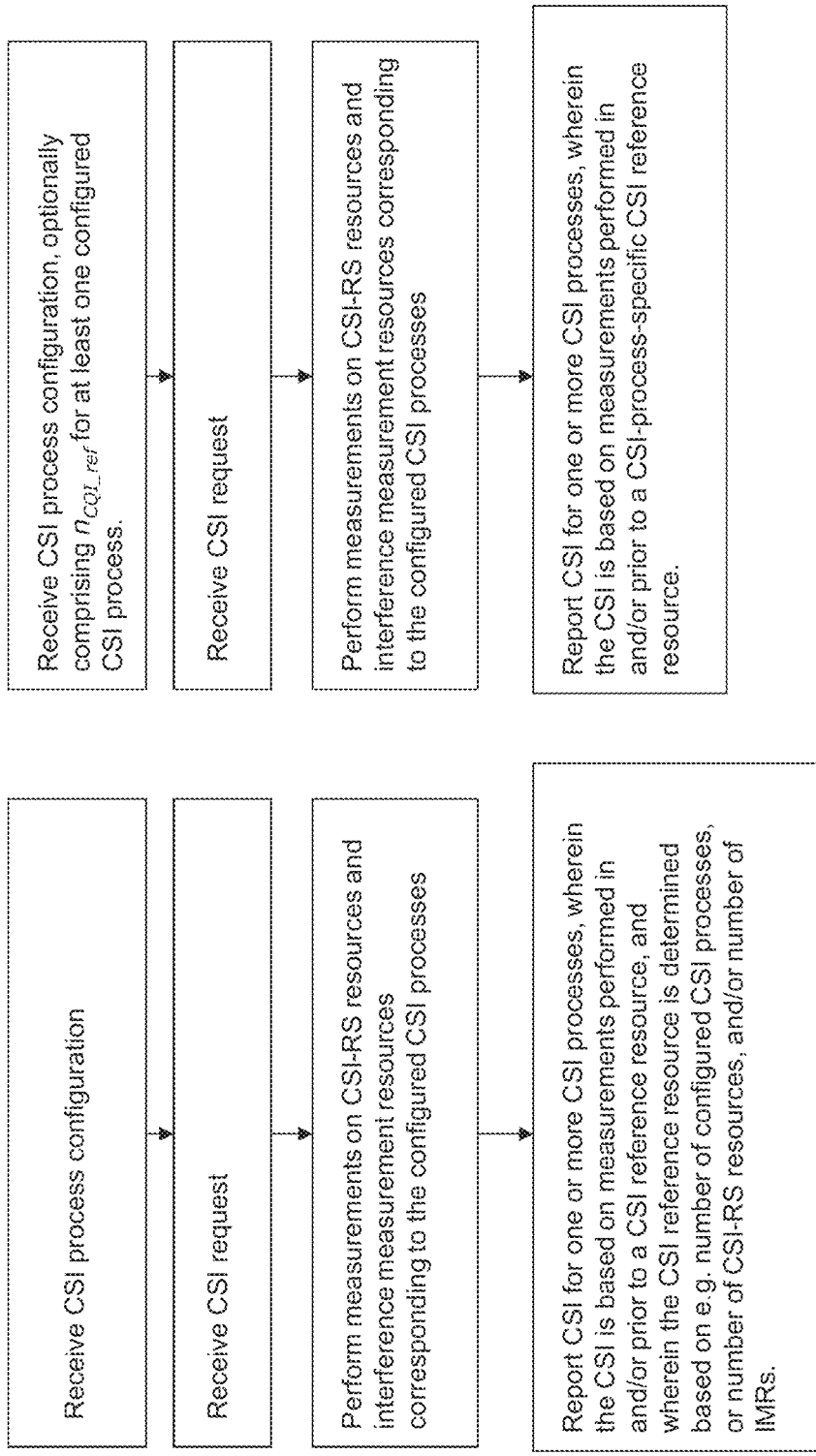
Figure 8c: Method in wireless device
Figure 8d: Method in wireless device

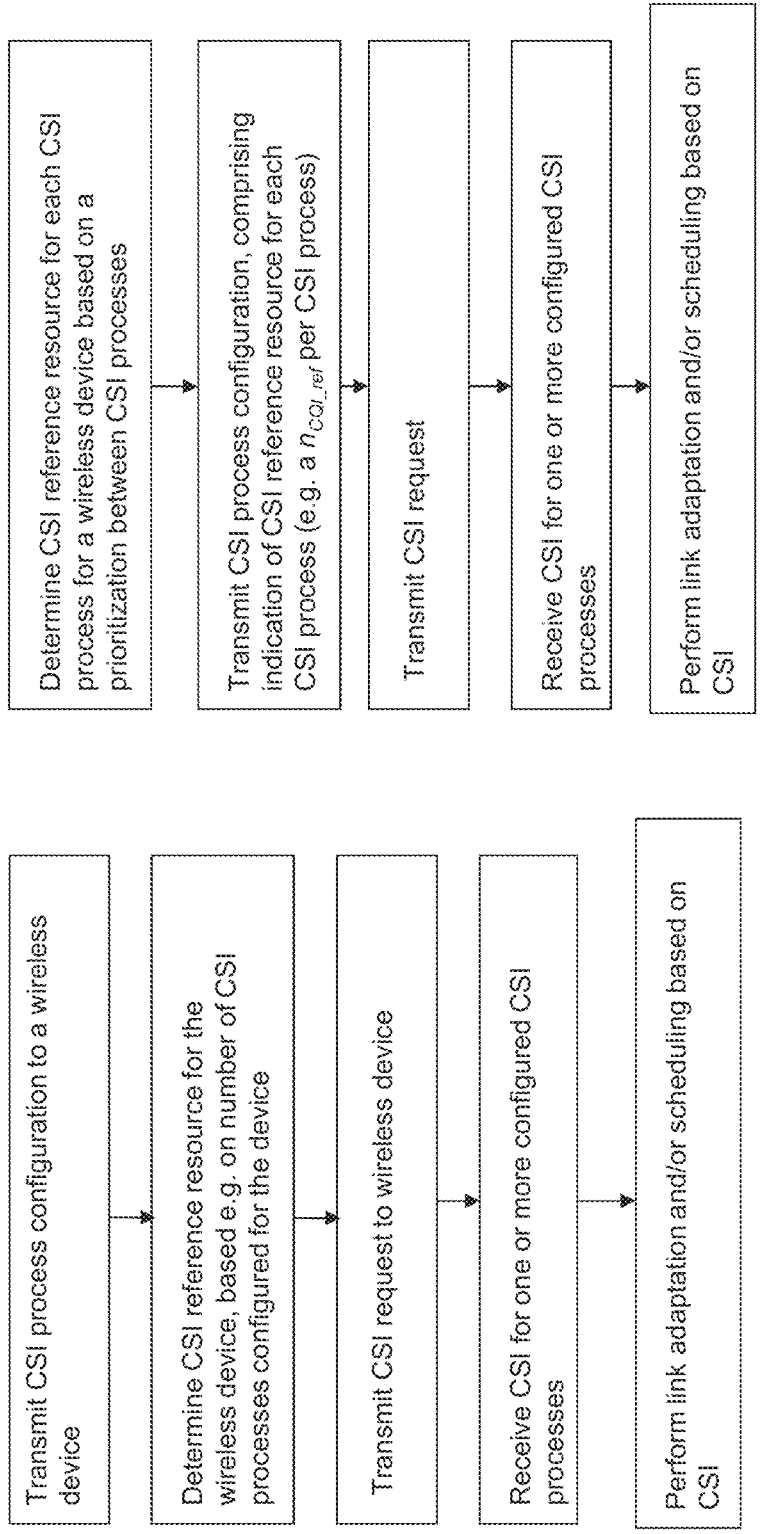
Figure 8f: Method in network node
Figure 8e: Method in network node

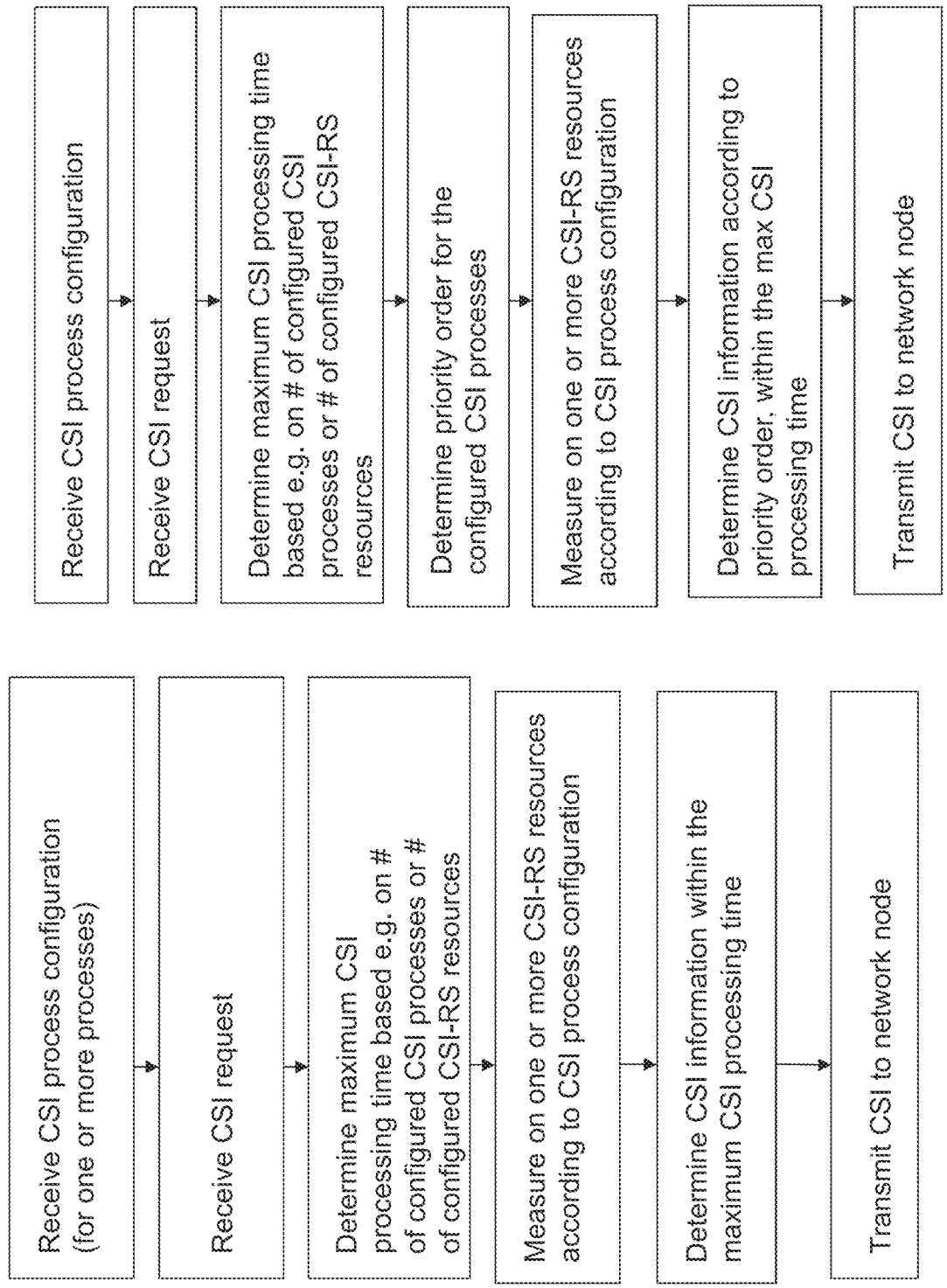
Figure 11: Method in wireless device
Figure 10: Method in wireless device

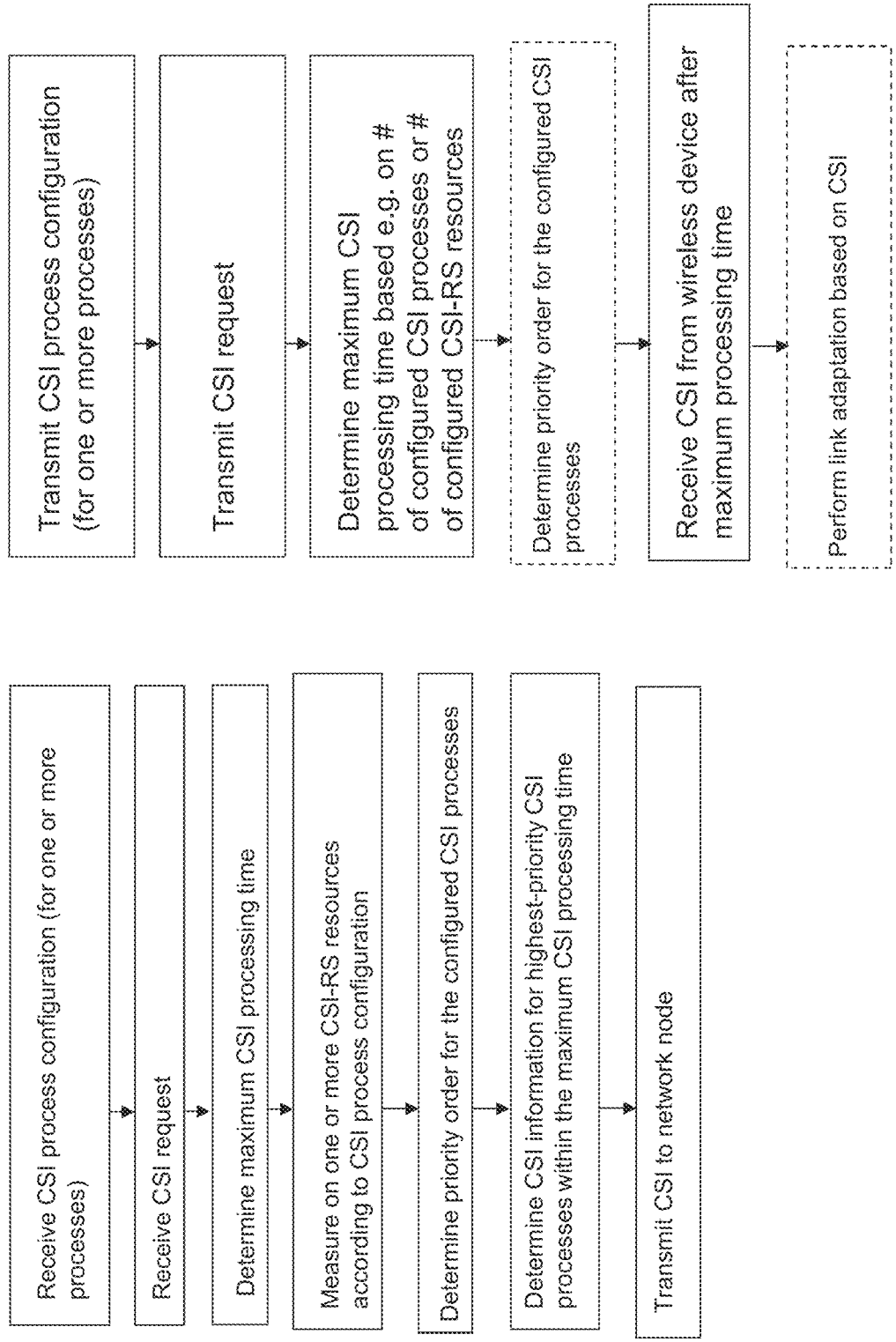
Figure 12: Method in wireless device
Figure 13: Method in network node

METHODS AND ARRANGEMENTS FOR CSI REPORTING

RELATED APPLICATIONS

The present application is a continuation of U.S. application Ser. No. 15/653,975, filed Jul. 19, 2017, which is a continuation of U.S. application Ser. No. 15/201,183, filed Jul. 1, 2016, now U.S. Pat. No. 9,749,111, which is a continuation of U.S. application Ser. No. 13/991,306, filed Jun. 3, 2013, now U.S. Pat. No. 9,385,852, which is the national stage entry under 35 U.S.C. 371 of international application no. PCT/SE2013/050518, filed May 8, 2013, which claims the benefit of U.S. provisional application No. 61/645,500, filed May 10, 2012, each of which applications are incorporated herein by reference in their entirety.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Radio Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 Hz when carrier aggregation is employed. LTE is also able to operate in different frequency bands and can operate in at least Frequency Division Duplex (FDD) and Time Division Duplex (TDD) modes.

LTE uses orthogonal frequency-division multiplexing (OFDM) in the downlink and discrete-Fourier-transform-spread (DFT-spread) OFDM in the uplink. The basic LTE physical resource can be seen as a time-frequency grid, as illustrated in FIG. 1, where each time-frequency resource element (TFRE) corresponds to one subcarrier during one OFDM symbol interval, on a particular antenna port. There is one resource grid per antenna port. The resource allocation in LTE is described in terms of resource blocks, where a resource block corresponds to one slot in the time domain and 12 contiguous 15 kHz subcarriers in the frequency domain. Two time-consecutive resource blocks represent a resource block pair, which corresponds to the time interval upon which scheduling operates.

An antenna port is a "virtual" antenna, which is defined by an antenna port-specific reference signal (RS). An antenna port is defined such that the channel over which a symbol on the antenna port is conveyed can be inferred from the channel over which another symbol on the same antenna port is conveyed. The signal corresponding to an antenna port may possibly be transmitted by several physical antennas, which may also be geographically distributed. In other words, an antenna port may be transmitted from one or several transmission points. Conversely, one transmission point may transmit one or several antenna ports. Antenna ports may interchangeably be referred to as "RS ports".

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. LTE Release 10 and above (also referred to as LTE-Advanced) enables support of eight-layer spatial multiplexing with possibly channel dependent precoding. Such spatial multiplexing is aimed for high data rates in favorable channel conditions. An illustration of precoded spatial multiplexing is provided in FIG. 2.

As seen, the information carrying symbol vector s is multiplied by an $N_T \times r$ precoder matrix $W_{N_T \times r}$, which serves to distribute the transmit energy in a subspace of the $N_T$ dimensional vector space, where $N_T$ corresponds to the number of antenna ports. The r symbols in s each are part of a symbol stream, a so-called layer, and r is referred to as the transmission rank. In this way, spatial multiplexing is achieved since multiple symbols can be transmitted simultaneously over the same TFRE. The number of layers, r, is typically adapted to suit the current channel properties.

Furthermore, the precoder matrix is often selected from a codebook of possible precoder matrices, and typically indicated by means of a precoder matrix indicator (PMI), which for a given rank specifies a unique precoder matrix in the codebook. If the precoder matrix is confined to have orthonormal columns, then the design of the codebook of precoder matrices corresponds to a Grassmannian subspace packing problem.

The received $N_R \times 1$ vector $y_n$ on the data TFRE indexed n is modeled by $$y_n = H_n W_{N_T \times r} s_n + e_n \tag{1}$$

where $e_n$ is a noise plus interference vector modeled as realizations of a random process. The precoder for rank r, $W_{N_T \times r}$, can be a wideband precoder, which is either constant over frequency, or frequency selective.

The precoder matrix is often chosen to match the characteristics of the $N_R \times N_T$ MIMO channel H, resulting in so-called channel dependent precoding. When based on UE feedback, this is commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

In closed-loop precoding, the UE transmits, based on channel measurements in the forward link, or downlink, recommendations to the base station, which in LTE is called the evolved NodeB (eNodeB) of a suitable precoder to use. A single precoder that is supposed to cover a large bandwidth (wideband precoding) may be fed back. It may also be beneficial to match the frequency variations of the channel and instead feed back a frequency-selective precoding report, e.g. several precoders, one per subband. This is an example of the more general case of channel state information (CSI) feedback, which also encompasses feeding back other entities than precoders to assist the eNodeB in subsequent transmissions to the UE. Thus, channel state information may include one or more of PMI, channel quality indicators (CQIs) or rank indicator (RI).

Signal and channel quality estimation is a fundamental part of a modern wireless system. Noise and interference estimates are used not only in the demodulator, but are also important quantities when estimating, for example, the channel quality indicator (CQI), which is typically used for link adaptation and scheduling decisions on the eNodeB side.

The term $e_n$ in (1) represents noise and interference in a TFRE and is typically characterized in terms of second order statistics such as variance and correlation. The interference can be estimated in several ways including from the cell-specific reference symbols (RS) that are present in the time-frequency grid of LTE. Such RS may correspond to the Rel-8 cell-specific RS, CRS (antenna ports 0-3), which are illustrated in FIG. 3, as well as the new CSI RS available in Rel-10, which will be described in more detail below. CRS are sometimes also referred to as common reference signals.

Estimates of interference and noise can be formed in various ways. Estimates can easily be formed based on TFREs containing cell specific RS since $s_n$ and $W_{N_T \times r}$ are then known and $H_n$ is given by the channel estimator. It is further noted that the interference on TFREs with data that is scheduled for the UE in question can also be estimated as soon as the data symbols, $s_n$ are detected, since at that moment they can be regarded as known symbols. The latter interference can alternatively also be estimated based on second order statistics of the received signal and the signal intended for the UE of interest, thus possibly avoiding needing to decode the transmission before estimating the interference term. Alternatively the interference can be measured on TFREs where the desired signal is muted, so the received signal corresponds to interference only. This has the advantage that the interference measurement may be more accurate and the UE processing becomes trivial because no decoding or desired signal subtraction need to be performed.

Channel State Information Reference Signal (CSI-RS)

In LTE Release-10, a new reference symbol sequence, the CSI-RS, was introduced for the purpose of estimating channel state information. The CSI-RS provides several advantages over basing the CSI feedback on the cell-specific reference symbols (CRS) which were used for that purpose in previous releases. Firstly, the CSI-RS is not used for demodulation of the data signal, and thus does not require the same density. In other words, the overhead of the CSI-RS is substantially less. Secondly, CSI-RS provides a much more flexible means to configure CSI feedback measurements. For example, which CSI-RS resource to measure on can be configured in a UE specific manner. Moreover, the support of antenna configurations larger than 4 antennas must resort to CSI-RS, since the CRS is only defined for at most 4 antennas.

By measuring on a CSI-RS a UE can estimate the effective channel the CSI-RS is traversing including the radio propagation channel, antenna gains, and any possible antenna virtualizations. A CSI-RS port may be precoded so that it is virtualized over multiple physical antenna ports; that is, the CSI-RS port can be transmitted on multiple physical antenna ports, possibly with different gains and phases. In more mathematical rigor this implies that if a known CSI-RS signal $x_n$ is transmitted, a UE can estimate the coupling between the transmitted signal and the received signal, i.e. the effective channel. Hence if no virtualization is performed in the transmission:

$$y_n = H_n x_n + e_n$$

the UE can measure the effective channel $H_{eff} = H_n$. Similarly, if the CSI-RS is virtualized using a precoder $W_{N_T \times r}$ as $$y_n = H_n W_{N_T \times r} x_n + e_n$$

the UE can estimate the effective channel $H_{eff} = H_n W_{N_T \times r}$.

Related to CSI-RS is the concept of zero-power CSI-RS resources (also known as a muted CSI-RS) that are configured just as regular CSI-RS resources, so that a UE knows that the data transmission is mapped around those resources. The intent of the zero-power CSI-RS resources is to enable the network to mute the transmission on the corresponding resources as to boost the SINR of a corresponding non-zero power CSI-RS, possibly transmitted in a neighbor cell/transmission point. For Rel-11 of LTE, a special zero-power CSI-RS that a UE is mandated to use for measuring interference plus noise is under discussion. As the name indicates, a UE can assume that the TPs of interest are not transmitting on the muted CSI-RS resource and the received power can therefore be used as a measure of the interference plus noise level.

Based on a specified CSI-RS resource and an interference measurement configuration, e.g. a muted CSI-RS resource, the UE can estimate the effective channel and noise plus interference, and consequently also determine which rank, precoder and transport format to recommend that best match the particular channel.

Coordinated Multipoint Transmission (CoMP)

CoMP transmission and reception refers to a system where the transmission and/or reception at multiple, geographically separated antenna sites is coordinated in order to improve system performance. More specifically, CoMP refers to coordination of antenna arrays that have different geographical coverage areas. In the subsequent discussion we refer to a set of antennas covering essentially the same geographical area in the same manner as a point, or more specifically as a Transmission Point (TP). Thus, a point might correspond to one of the sectors at a site, but it may also correspond to a site having one or more antennas all intending to cover a similar geographical area. Often, different points represent different sites. Antennas correspond to different points when they are sufficiently geographically separated and/or have antenna diagrams pointing in sufficiently different directions. Although the present disclosure focuses mainly on downlink CoMP transmission, it should be appreciated that in general, a transmission point may also function as a reception point. The coordination between points can either be distributed, by means of direct communication between the different sites, or by means of a central coordinating node. A set of points that perform coordinated transmission and/or transmission is referred to as a CoMP coordination cluster, a coordination cluster, or simply as a cluster in the following.

FIG. 5 shows an example wireless network with a CoMP coordination cluster comprising three transmission points, denoted TP1, TP2 and TP3.

CoMP is a tool introduced in LTE to improve the coverage of high data rates, the cell-edge throughput and/or to increase system throughput. In particular, the goal is to distribute the user perceived performance more evenly in the network by taking control of the interference in the system, either by reducing the interference and/or by better prediction of the interference.

CoMP operation targets many different deployments, including coordination between sites and sectors in cellular macro deployments, as well as different configurations of Heterogeneous deployments, where for instance a macro node coordinates the transmission with pico nodes within the macro coverage area.

There are many different CoMP transmission schemes that are considered; for example, Dynamic Point Blanking where multiple transmission points coordinates the transmission so that neighboring transmission points may mute the transmissions on the time-frequency resource elements (TFREs) that are allocated to UEs that experience significant interference.

Coordinated Beamforming where the TPs coordinate the transmissions in the spatial domain by beamforming the transmission power in such a way that the interference to UEs served by neighboring TPs are suppressed.

Dynamic Point Selection where the data transmission to a UE may switch dynamically (in time and frequency) between different transmission points, so that the transmission points are fully utilized.

Joint Transmission where the signal to a UE is simultaneously transmitted from multiple TPs on the same time/frequency resource. The aim of joint transmission is to increase the received signal power and/or reduce the received interference, if the cooperating TPs otherwise would serve some other UEs without taking our JT UE into consideration.

CoMP Feedback

A common denominator for the CoMP transmission schemes is that the network needs CSI information not only for the serving TP, but also for the channels linking the neighboring TPs to a terminal. By, for example, configuring a unique CSI-RS resource per TP, a UE can resolve the effective channels for each TP by measurements on the corresponding CSI-RS. Note that the UE is likely unaware of the physical presence of a particular TP, it is only configured to measure on a particular CSI-RS resource, without knowing of any association between the CSI-RS resource and a TP.

A detailed example showing which resource elements within a resource block pair may potentially be occupied by UE-specific RS and CSI-RS is provided in FIG. 4. In this example, the CSI-RS utilizes an orthogonal cover code of length two to overlay two antenna ports on two consecutive REs. As seen, many different CSI-RS patterns are available. For the case of 2 CSI-RS antenna ports, for example, there are 20 different patterns within a subframe. The corresponding number of patterns is 10 and 5 for 4 and 8 CSI-RS antenna ports, respectively.

A CSI-RS resource may be described as the pattern of resource elements on which a particular CSI-RS configuration is transmitted. One way of determining a CSI-RS resource is by a combination of the parameters "resourceConfig", "subframeConfig", and "antennaPorts-Count", which may be configured by RRC signaling.

Several different types of CoMP feedback are possible. Most alternatives are based on per CSI-RS resource feedback, possibly with CQI aggregation of multiple CSI-RS resources, and also possibly with some sort of co-phasing information between CSI-RS resources. The following is a non-exhaustive list of relevant alternatives (note that a combination of any of these alternatives is also possible):

Per CSI-RS resource feedback corresponds to separate reporting of channel state information (CSI) for each of a set of CSI-RS resources. Such a CSI report may, for example, comprise one or more of a Precoder Matrix Indicator (PMI), Rank Indicator (RI), and/or Channel Quality Indicator (CQI), which represent a recommended configuration for a hypothetical downlink transmission over the same antennas used for the associated CSI-RS, or the RS used for the channel measurement. More generally, the recommended transmission should be mapped to physical antennas in the same way as the reference symbols used for the CSI channel measurement.

Typically there is a one-to-one mapping between a CSI-RS and a TP, in which case per CSI-RS resource feedback corresponds to per-TP feedback; that is, a separate PMI/RI/CQI is reported for each TP. Note that there could be interdependencies between the CSI reports; for example, they could be constrained to have the same RI. Interdependencies between CSI reports have many advantages, such as; reduced search space when the UE computes feedback, reduced feedback overhead, and in the case of reuse of RI there is a reduced need to perform rank override at the eNodeB.

The considered CSI-RS resources are configured by the eNodeB as the CoMP Measurement Set. In the example shown in FIG. 5, different measurement sets may be configured for wireless devices 540 and 550. For example, the measurement set for wireless device 540 may consist of CSI-RS resources transmitted by TP1 and TP2, since these points may be suitable for transmission to device 540. The measurement set for wireless device 550 may instead be configured to consist of CSI-RS resources transmitted by TP2 and TP3. The wireless devices will report CSI information for the transmission points corresponding to their respective measurement sets, thereby enabling the network to e.g. select the most appropriate transmission point for each device.

Aggregate feedback corresponds to a CSI report for a channel that corresponds to an aggregation of multiple CSI-RS. For example, a joint PMI/RI/CQI can be recommended for a joint transmission over all antennas associated with the multiple CSI-RS.

A joint search may however be too computationally demanding for the UE, and a simplified form of aggregation is to evaluate an aggregate CQI which are combined with per CSI-RS resource PMIs, which should typically all be of the same rank corresponding to the aggregated CQI or CQIs. Such a scheme also has the advantage that the aggregated feedback may share much information with a per CSI-RS resource feedback. This is beneficial, because many CoMP transmission schemes require per CSI-RS resource feedback, and to enable eNodeB flexibility in dynamically selecting CoMP scheme, aggregated feedback would typically be transmitted in parallel with per CSI-RS resource feedback. To support coherent joint transmission, such per CSI-RS resource PMIs can be augmented with co-phasing information enabling the eNodeB to rotate the per CSI-RS resource PMIs so that the signals coherently combine at the receiver.

Interference Measurements for CoMP

For efficient CoMP operation it is equally important to capture appropriate interference assumptions when determining the CSI as it is to capture the appropriate received desired signal.

For the purpose of this disclosure, a CSI process is defined as the reporting process of CSI (e.g., CQI and potentially associated PMI/RI) for a particular effective channel, and an interference measurement resource. Optionally, a CSI process may also be associated with one or more interference emulation configurations, as will be explained below. The effective channel is defined by a reference signal resource comprising one or multiple associated reference sequences. The interference measurement resource is a set of resource elements in which one or more signals that are assumed to be interfering with the desired signal are received. The IMR may correspond to a particular CQI reference resource, e.g. a CRS resource. Alternatively, the IMR may be a resource configured specifically for measuring interference.

In uncoordinated systems the UE can effectively measure the interference observed from all other TPs (or all other cells), which will be the relevant interference level in an upcoming data transmission. Such interference measurements are typically performed by analyzing the residual interference on CRS resources, after the UE subtracts the impact of the CRS signal. In coordinated systems performing CoMP such interference measurements becomes increasingly irrelevant. Most notably, within a coordination cluster an eNodeB can to a large extent control which TPs that interfere a UE in any particular TFRE. Hence, there will be multiple interference hypotheses depending on which TPs are transmitting data to other terminals.

For the purpose of improved interference measurements new functionality is introduced in LTE Release 11, where the agreement is that the network will be able to configure which particular TFREs that is to be used for interference measurements for a particular UE; this is defined as an interference measurement resource (IMR). The network can thus control the interference seen on a IMR, by for example muting all TPs within a coordination cluster on the associated TFREs, in which case the terminal will effectively measure the inter CoMP cluster interference. In the example shown in FIG. 5, this would correspond to muting TP1, TP2 and TP3 in the TFREs associated with the IMR.

Consider for example a dynamic point blanking scheme, where there are at least two relevant interference hypotheses for a particular UE: in one interference hypothesis the UE sees no interference from the coordinated transmission point; and in the other hypothesis the UE sees interference from the neighboring point. To enable the network to effectively determine whether or not a TP should be muted, the network may configure the UE to report two, or generally multiple CSIs corresponding to different interference hypotheses—that is, there can be two CSI processes corresponding to different interference situations. Continuing the example of FIG. 5, assume that the wireless device 550 is configured to measure CSI from TP3. However, TP2 may potentially interfere with a transmission from TP2, depending on how the network schedules the transmission. Thus, the network may configure the device 550 with two CSI processes for TP3 (or, more specifically, for measuring the CSI-RS transmitted by TP3). One CSI process is associated with the interference hypothesis that TP2 is silent, and the other CSI process corresponds to the hypothesis that TP3 is transmitting an interfering signal.

To facilitate such a scheme it has been proposed to configure multiple IMRs, wherein the network is responsible for realizing each relevant interference hypothesis in the corresponding IMR. Hence, by associating a particular IMR with a particular CSI process, relevant CSI information, e.g. CQI, can be made available to the network for effective scheduling. In the example of FIG. 5, the network may, for example, configure one IMR in which only TP2 is transmitting, and another IMR in which TP2 and TP3 are both silent. Each CSI process may then be associated with a different IMR.

Another approach for estimating interference, which may be used in conjunction with measurements based on an IMR, is to have the terminal emulate interference from within the coordinated points according to an interference hypothesis, by for example assuming an isotropic transmission from each of the transmission points that are assumed interfering for the interference hypothesis. This has the advantage that it may be sufficient that the terminal performs interference measurements on a single IMR, where there is no interference from the coordinated transmission points, from which each of the interference hypothesis are derived. For example, assume that this residual interference and noise is measured and characterized, by the terminal, as a complex valued Gaussian random process $$e_n \in CN(0, Q_e),$$

where $Q_e$ is the correlation matrix and the elements of $e_n$ corresponds to an interference realization on each of the receive antennas. Then the terminal can amend the residual interference to correspond to a particular CoMP interference hypothesis by emulating intra CoMP cluster interference from a transmission point, for which it has measured an effective channel, $H_{eff}$, as $$\tilde{e}_n = e_n + H_{eff} q_n$$

where $q_n$ is an isotropic random signal of a specific nominal power. Note, however, that for a terminal to be able to emulate intra CoMP cluster interference the terminal needs to acquire a reliable channel estimate for each point it should add interference for, which means that the associated reference signals need to be known and have a sufficiently high SINR.

If interference emulation is applied, a CSI process may further correspond to one or more interference emulation configurations. Each interference emulation configuration is associated with a reference signal received from an assumed interferer. The wireless device estimates, for each interference emulation configuration, an effective channel based on the associated reference signal. The wireless device then emulates interference for each interference emulation configuration based on the estimated effective channel for that configuration. As explained above, one way of emulating interference is to multiply the channel estimate by an isotropic random signal.

Although the possibility of associating a CSI process with one or more IMRs and/or interference emulation configurations enables the network to obtain a better basis for making link adaptation and scheduling decisions, there is still room for further improvement when determining channel state information.

SUMMARY

An object of the present invention is to provide an improved mechanism for determining channel state information.

Some embodiments disclosed herein provide a method in a wireless device for reporting Channel State Information, CSI. The wireless device is comprised in a wireless communications system 500. The method comprises receiving a CSI process configuration and a request for CSI information from a network node. Further, the wireless device reports CSI for one or more CSI processes, wherein the CSI is determined such as to reflect the state of the channel for a CSI reference resource. According to the method, the CSI reference resource is determined based on the number of configured CSI processes.

Some embodiments provide a wireless device for reporting CSI. The wireless device is adapted to receive a CSI process configuration and a request for CSI information from a network node. The wireless device is further adapted to report CSI for one or more CSI processes, wherein the CSI is determined such as to reflect the state of the channel for a CSI reference resource. Furthermore, the CSI reference resource is determined based on the number of configured CSI processes.

Yet further embodiments provide a user equipment for reporting CSI. The user equipment comprises a processor and a memory. The memory comprises instructions which, when executed, cause the user equipment to be configured to receive a CSI process configuration and a request for CSI information from a network node, and further cause the user equipment to be configured to report CSI for one or more CSI processes, wherein the CSI is determined such as to reflect the state of the channel for a CSI reference resource, and wherein the CSI reference resource is determined based on the number of configured CSI processes.

An advantage of some embodiments disclosed herein is that the required peak processing capability of a wireless device can be reduced, while maintaining acceptable support also for large CoMP feedback configurations. This is made possible in some embodiments by making the location of the CSI reference resource dependent on some parameter(s), e.g. the number of configured CSI processes, thereby effectively increasing the CSI processing time window for the wireless device when this is likely to be needed.

BRIEF DESCRIPTION OF THE DRAWINGS

Embodiments will now be described in more detail in relation to the enclosed drawings, in which:

FIG. 8c is a flowchart of a method in a wireless device of reporting CSI in accordance with one or more embodiments.

FIG. 8d is a flowchart of a method in a wireless device of reporting CSI in accordance with one or more embodiments.

FIG. 8e is a flowchart of a method in a network node of performing link adaptation and/or scheduling based on received CSI in accordance with one or more embodiments.

FIG. 8f is a flowchart of a method in a network node of performing link adaptation and/or scheduling based on received CSI in accordance with one or more embodiments.

FIG. 10 is a flowchart of a method in a wireless device of transmitting CSI in accordance with one or more embodiments.

FIG. 11 is a flowchart of a method in a wireless device of transmitting CSI in accordance with one or more embodiments.

FIG. 12 is a flowchart of a method in a wireless device of transmitting CSI in accordance with one or more embodiments.

FIG. 13 is a flowchart of a method in a network node in accordance with one or more embodiments related to transmitting a CSI request.

DETAILED DESCRIPTION

Figure 1:
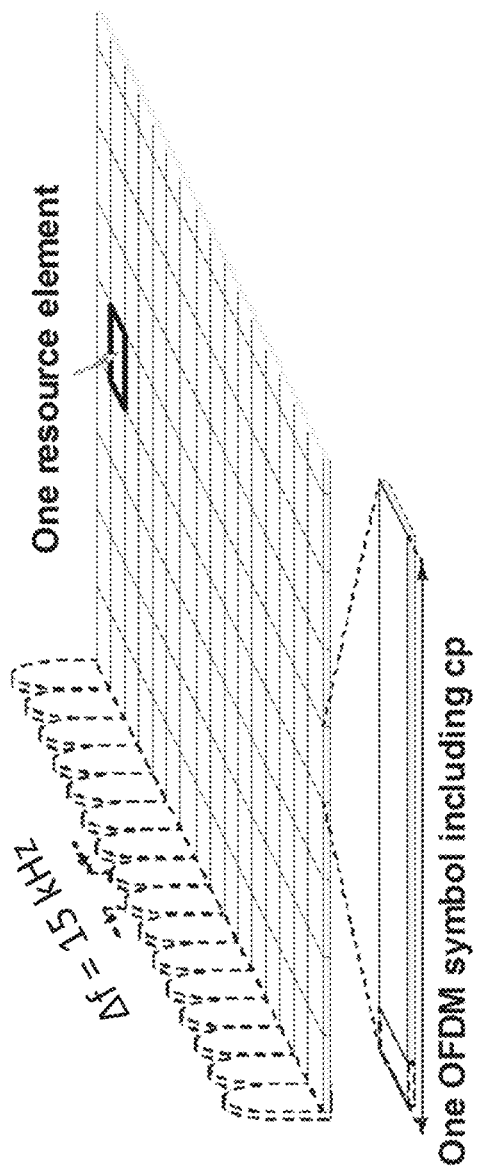
FIG. 1 is a diagram of a time frequency grid of resource elements.
Figure 2:
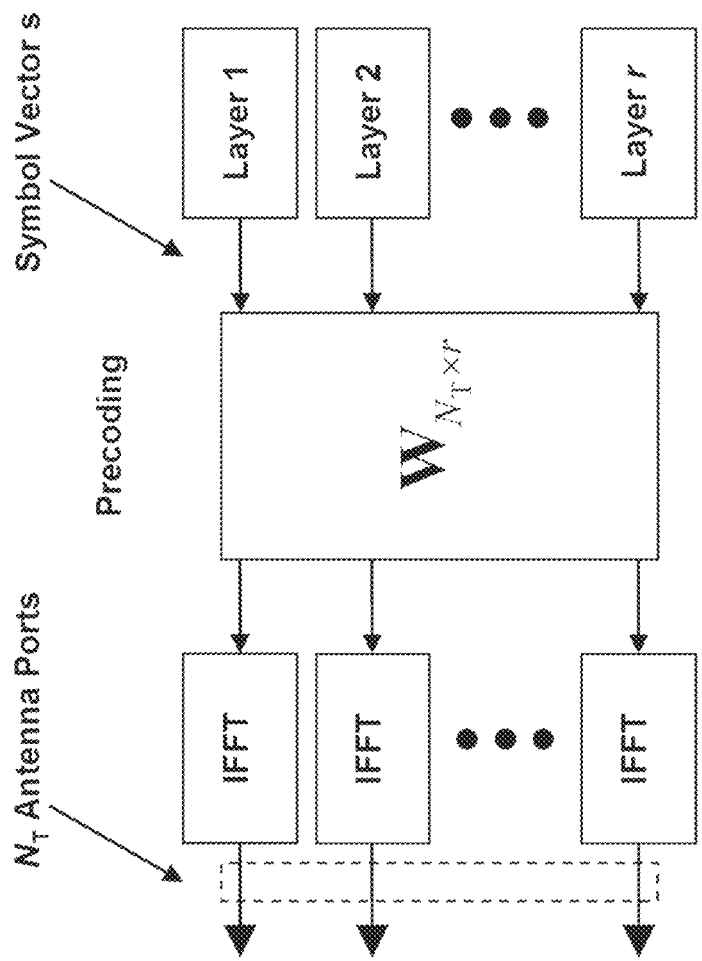
FIG. 2 is a block diagram of precoded spatial multiplexing.
Figure 3:
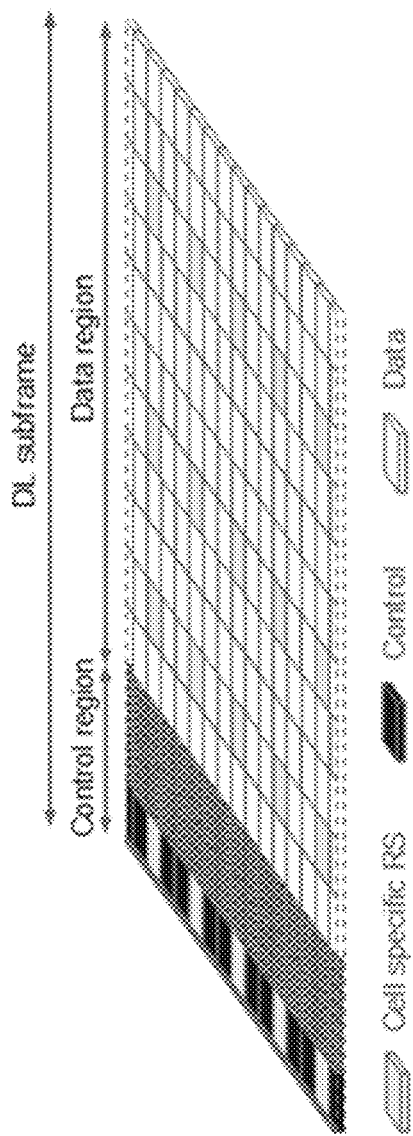
FIG. 3 is a diagram of resource elements in a downlink subframe.
Figure 4:
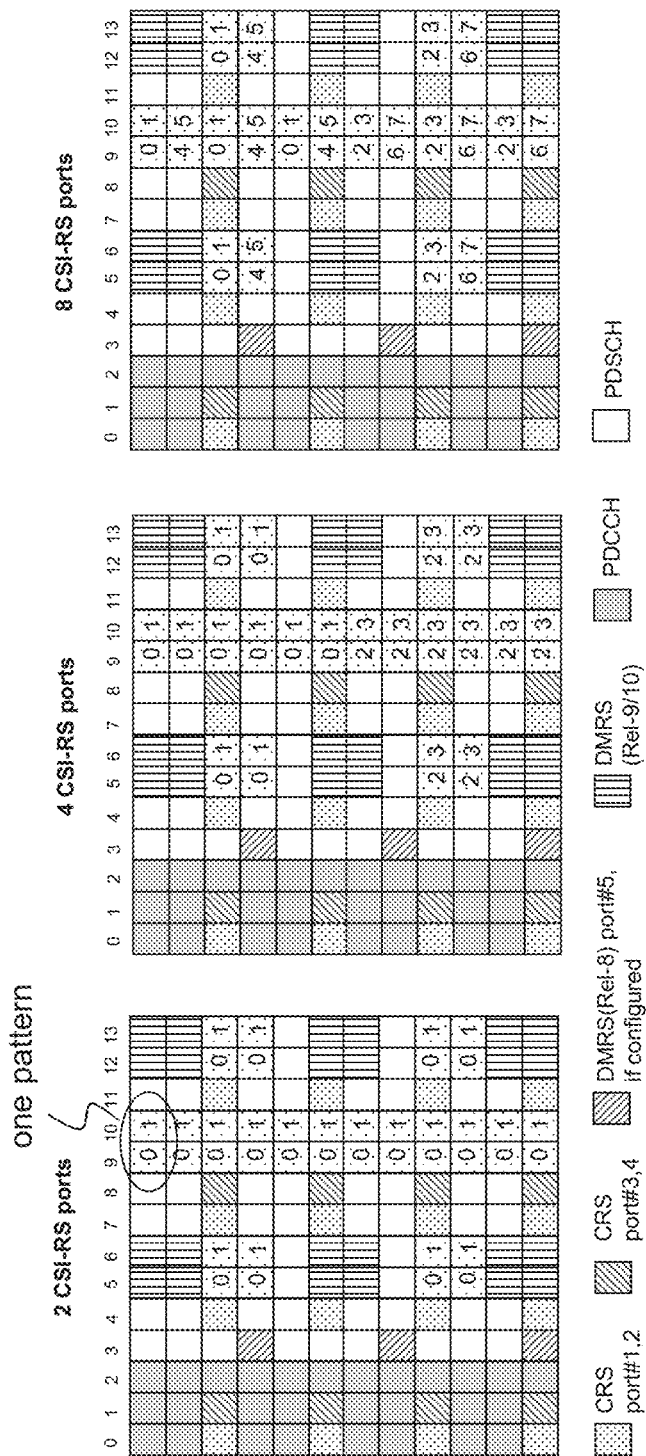
FIG. 4 is a diagram of resource element patterns.

A typical processing in a UE involved for determining a CSI report for a specific CSI process can be divided as:

1) Receiving at least one reference signal that defines a desired effective channel for said specific CSI process.

2) Receiving interference and noise on a specific interference measurement resource (IMR) associated with said specific CSI process.

3) Estimating/determining a desired effective channel from said received at least one reference signal.

4) Estimating a received interference and noise covariance, or level, from said received interference and noise 5) Assessing the performance of each transmission rank and precoder in a codebook 6) Selecting the PMI and RI corresponding to the highest performance (typically the PMI and RI combination that results in the highest throughput without exceeding a target BLER or 10%)

7) Determining a CQI (or multiple in case of rank >1) for the selected PMI/RI, involving selecting the highest CQI (recommended transport block size) that does not exceed a target BLER of 10%.

Each of these steps involves a non-negligible processing load in a typical UE implementation. In particular steps 5) to 7) above involves substantial processing. Moreover, these demanding steps cannot be performed prior to steps 1) through 4).

The UE is required to process CSI within a certain time frame after receiving a specific reference signal, or performing a specific interference measurement. This requirement may be encoded into a standard, e.g. the standard may mandate that the UE must be capable to report CSI a certain number of subframes (e.g. 4 subframes) after the subframe wherein the corresponding CSI-RS is transmitted. It should be noted that according to the prior art, this timing requirement is static and the same timing requirement applies to all UEs and all CSI reports. For example, in 3GPP LTE the processing time frame is determined by the so-called CSI reference resource with occurs 4 subframes prior to the time frame in which the CSI report is transmitted (or the first valid downlink subframe prior to this instance). Strictly speaking the CSI reference resource specifies, or is defined by <, a specific subframe for which the CSI report should accurately reflect the state of the channel; this implies that the UE should base the CSI report on the reference signals and interference and noise received within this subframe and prior to this subframe. See also FIG. 8a.

In a scenario where the UE is configured with multiple CSI processes, it is possible that some or all of the corresponding reference signal resources and IMRs occur in the same subframe, in which case it may become difficult for the UE to determine all the required CSI information within the specified time frame.

From a UE processing budget perspective, the worst case scenario is that all IMRs and all reference signals associated with a plurality of CSI processes all occur in a single subframe, because then all CSI processes must be computed simultaneously. Such a scenario could occur e.g. if all zero-power CSI-RS configured for a UE would share the same subframe offset and periodicity configuration, since this would imply that muting could only be configured for a single subframe within a period. Since the transmission of a CSI-RS should typically be matched by a corresponding muting in neighboring transmission points (to boost the SINR on the received CSI-RS signals), the transmission of a CSI-RS would in practice be confined to the same subframe as the muting configurations. Hence, it is quite possible that the worst-case scenario could occur in practice.

Figure 6:
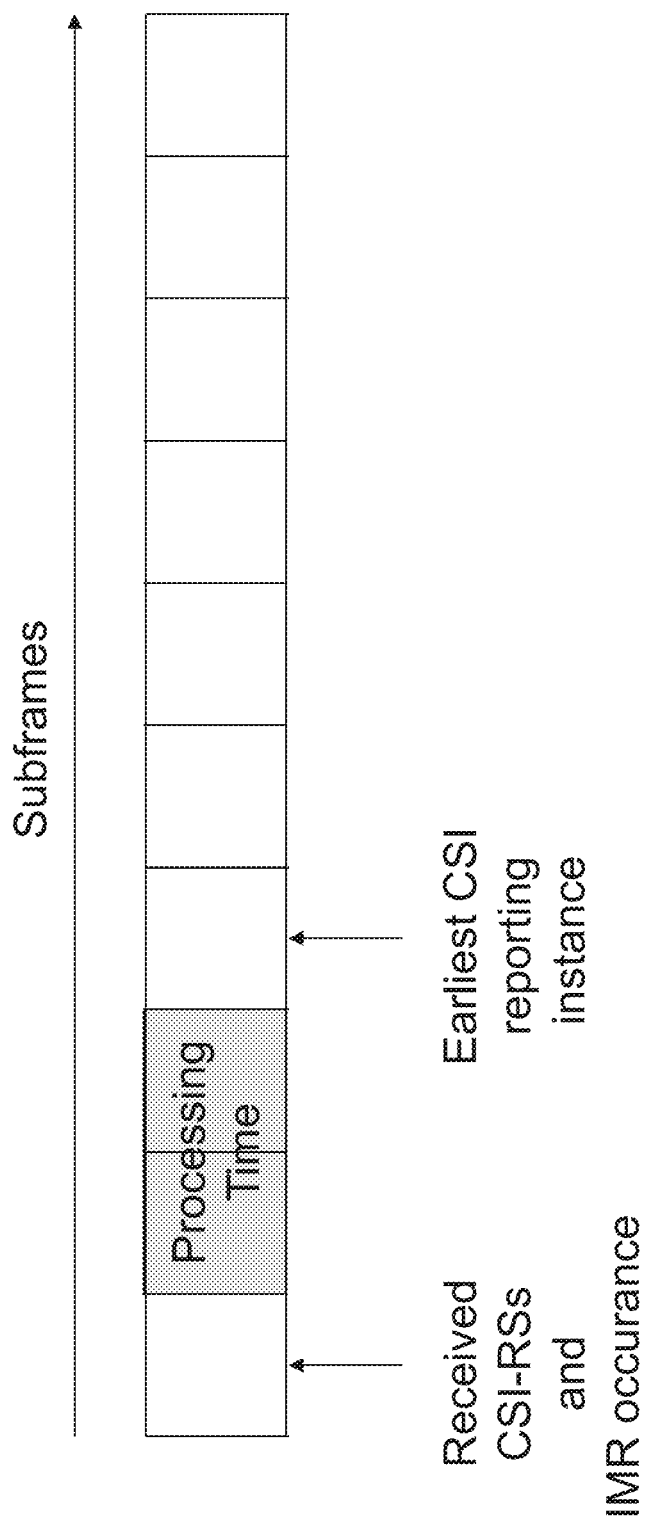
FIG. 6 is a signalling diagram of channel state information (CSI) reporting.

Such a situation is illustrated in FIG. 6, where the UE is required to finalize the CSI processing during a predetermined processing time after the reception (steps 1 and 2 above), so that reporting after the processing time will contain updated reports. Designing a UE to manage this worst case scenario may lead to very high implementation cost. This problem becomes particularly severe if large CoMP Measurement Set sizes are supported in the standard, and/or if a large number of parallel CSI processes are supported by the standard.

Thus, a possible solution to the problems described above would be to limit the size of the CoMP measurement set and/or the number of parallel CSI processes. This would reduce the processing requirements on the UE, but on the other hand means that the potential benefits of CoMP cannot be fully exploited.

A basic concept of some embodiments is therefore to reduce the peak processing requirement of a wireless device for CSI reporting by introducing a processing time window, also referred to as a maximum CSI processing time, which may either device-specific or CSI-process-specific. The maximum processing time may be expressed e.g. in subframes or milliseconds. The length of the time window may e.g. be dependent on the total number of CSI processes, or the number of CSI-RS resources, configured for the wireless device. For example, a CSI reference resource may depend on the number of configured CSI-RS resources or number of CSI processes.

Figure 5:
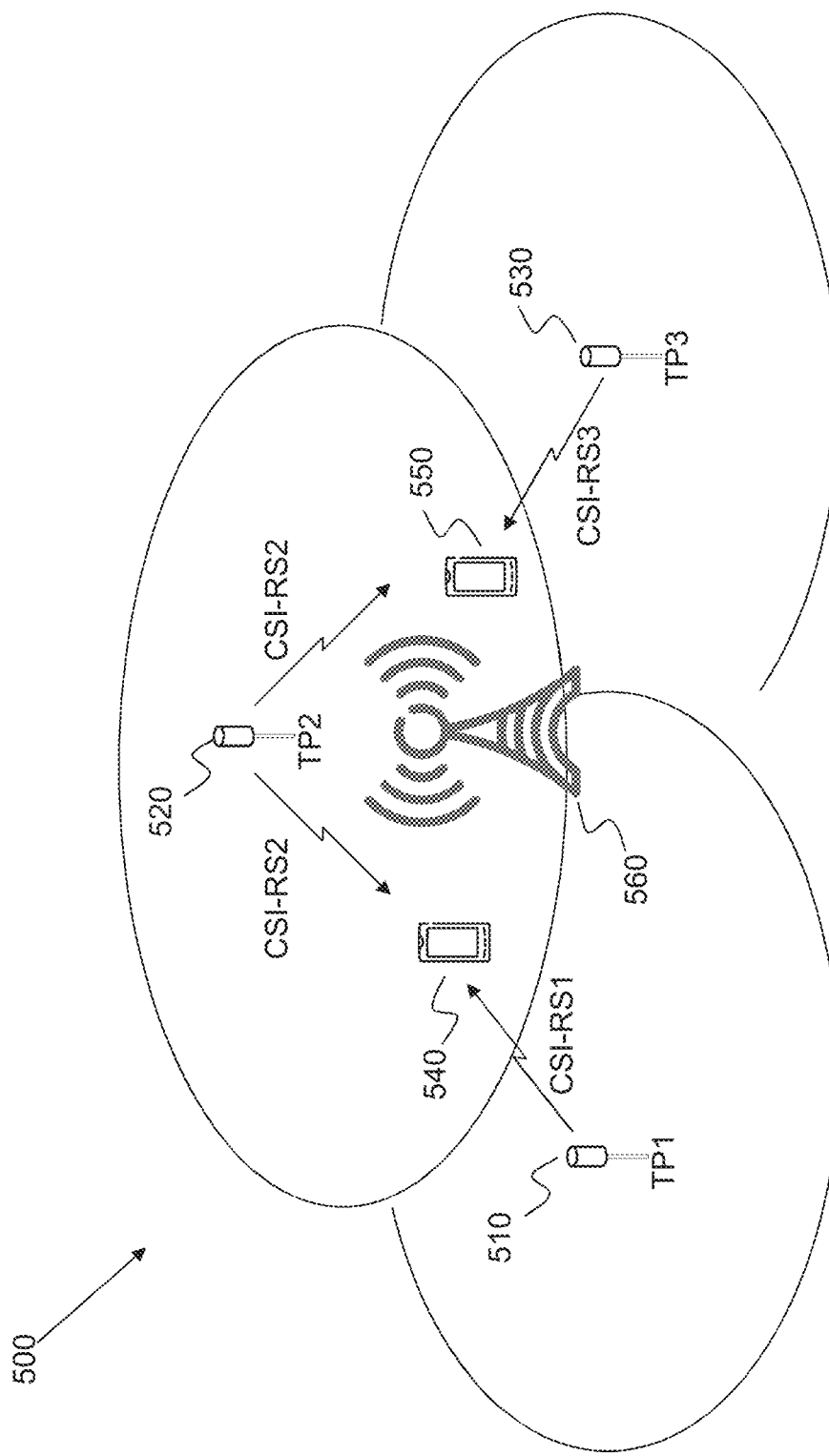
FIG. 5 is a diagram of a wireless communication system in accordance with one or more embodiments.

FIG. 5 illustrates an example wireless communications system 500 in which various embodiments of the invention may be implemented. The three transmission points 510, 520 and 530 form a CoMP coordination cluster. In the following, for purposes of illustration and not limitation, it will be assumed that the communications system 500 is an LTE system. Transmission points 510, 520 and 530 are remote radio units (RRU), controlled by eNodeB 560. In an alternative scenario (not shown), the transmission points could be controlled by separate eNodeBs. It should be appreciated that, generally speaking, each network node, e.g. eNodeB, may control one or more transmission points, which may either be physically co-located with the network node, or geographically distributed. In the scenario shown in FIG. 5, it is assumed that the transmission points 510, 520 and 530 are connected to eNodeB 560, e.g. by optical cable or a point-to-point microwave connection. In the case where some or all of the transmission point forming the cluster are controlled by different eNodeBs, those eNodeBs would be assumed to be connected with each other e.g. by means of a transport network, to be able to exchange information for possible coordination of transmission and reception.

It should be appreciated that although examples herein refer to an eNodeB for purposes of illustration, the invention applies to any network node. The expression "network node" as used in this disclosure is intended to encompass any radio base station, e.g. an eNodeB, NodeB, Home eNodeB or Home NodeB, or any other type of network node that controls all or part of a CoMP cluster.

The communications system 500 further comprises two wireless devices 540 and 550. Within the context of this disclosure, the term "wireless device" encompasses any type of wireless node which is able to communicate with a network node, such as a base station, or with another wireless device by transmitting and/or receiving wireless signals. Thus, the term "wireless device" encompasses, but is not limited to: a user equipment, a mobile terminal, a stationary or mobile wireless device for machine-to-machine communication, an integrated or embedded wireless card, an externally plugged in wireless card, a dongle etc. The wireless device may also be a network node, e.g. a base station. Throughout this disclosure, whenever the term "user equipment" is used this should not be construed as limiting, but should be understood as encompassing any wireless device as defined above.

In some embodiments (see FIG. 8c), a wireless device reports CSI for a CSI process.

The wireless device receives CSI process configuration, and a CSI request, from a network node.

The wireless device performs measurements on CSI-RS resources and interference measurement resources corresponding to the configured CSI processes. When a measurement is performed in a certain subframe, the wireless device will begin processing the received information for the purpose of determining channel state information for the corresponding CSI process. However, as mentioned above, this processing will take a certain amount of time to complete. It should be noted that a particular interference measurement resource may be shared by multiple CSI processes, in which case the interference measurement only has to be performed once in a particular subframe.

Similarly, the desired signal reference signal resource may be shared by multiple CSI processes, in which case the associated channel estimation only need to be performed once in a particular subframe.

The wireless device subsequently reports CSI for one or more processes, wherein the CSI is determined based on measurements performed in and/or or prior to a CSI reference resource. The wireless device determines the CSI reference resource depending on one or more of: the number of configured CSI-RS resources, the number of configured CSI processes, or the number of configured CSI-RS resources that occur in the same subframe.

Figure 8:
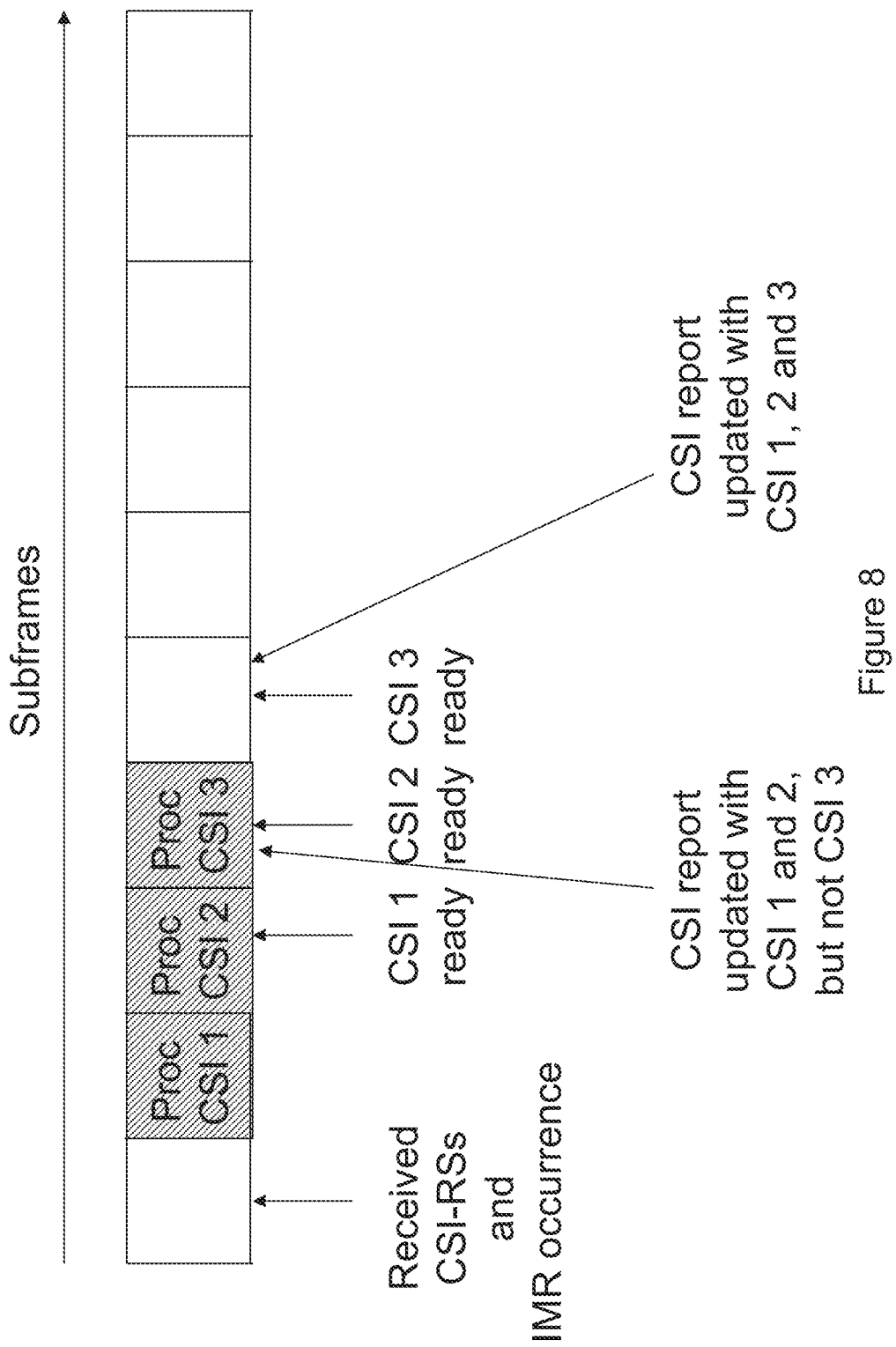
FIG. 8 is a signalling diagram of CSI reporting in accordance with one or more embodiments.
Figure 8A:
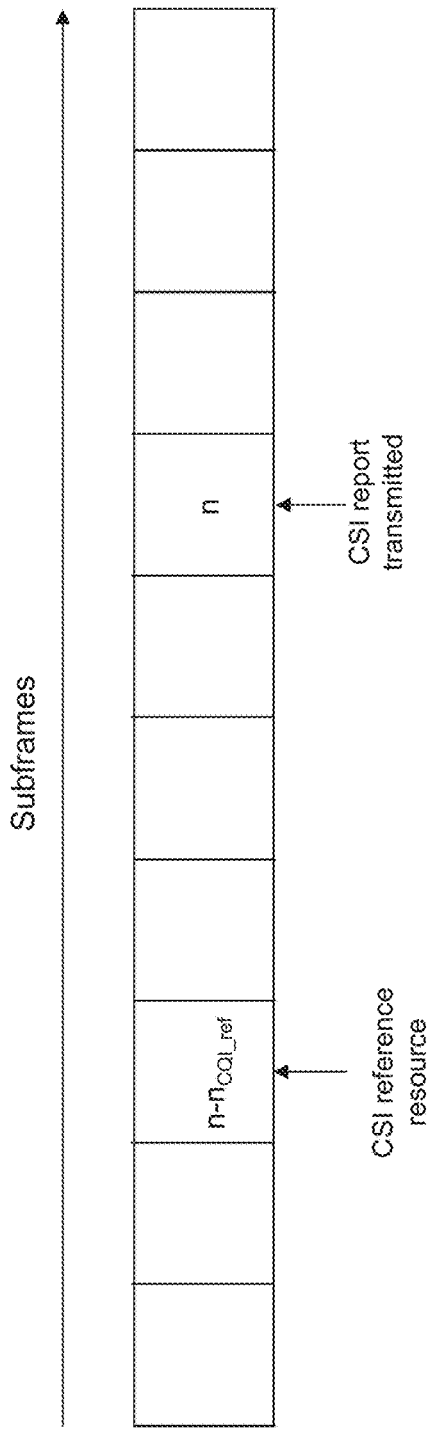
FIG. 8a is a signalling diagram of CSI reporting in accordance with one or more embodiments.

For instance, the wireless device may determine a number $n_{CQI\_ref}$ based on the number of configured CSI-RS resources, and/or based on the number of configured CSI processes, where $n_{CQI\_ref}$ represents the location of the CSI reference resource relative to the subframe in which the CSI report is transmitted (as shown in FIG. 8a). In a particular example, $n_{CQI\_ref}$ increases with the number of configured CSI processes. Stated differently, if the number of configured CSI processes increases, $n_{CQI\_ref}$ also increases.

As a specific example, if the number of configured CSI-RS (or number of configured CSI processes) exceeds 2, $n_{CQI\_ref}$ is set to 5, whereas otherwise, $n_{CQI\_ref}$ is set to 4. This accounts for the additional processing time that is required in the wireless device for the larger number of CSI-RS (or CSI processes). Stated differently, if the number of configured CSI-RS (or number of configured CSI processes) exceeds 2, the CSI reference resource is determined to be 5 subframes prior to the subframe when CSI is reported, and otherwise, the CSI reference resource is determined to be 4 subframes prior to the subframe when CSI is reported.

In one variant, the CSI reference resource is specific to the wireless device. For example, the wireless device determines one number $n_{CQI\_ref}$ which is applied to all CSI processes configured for the device.

Figure 8B:
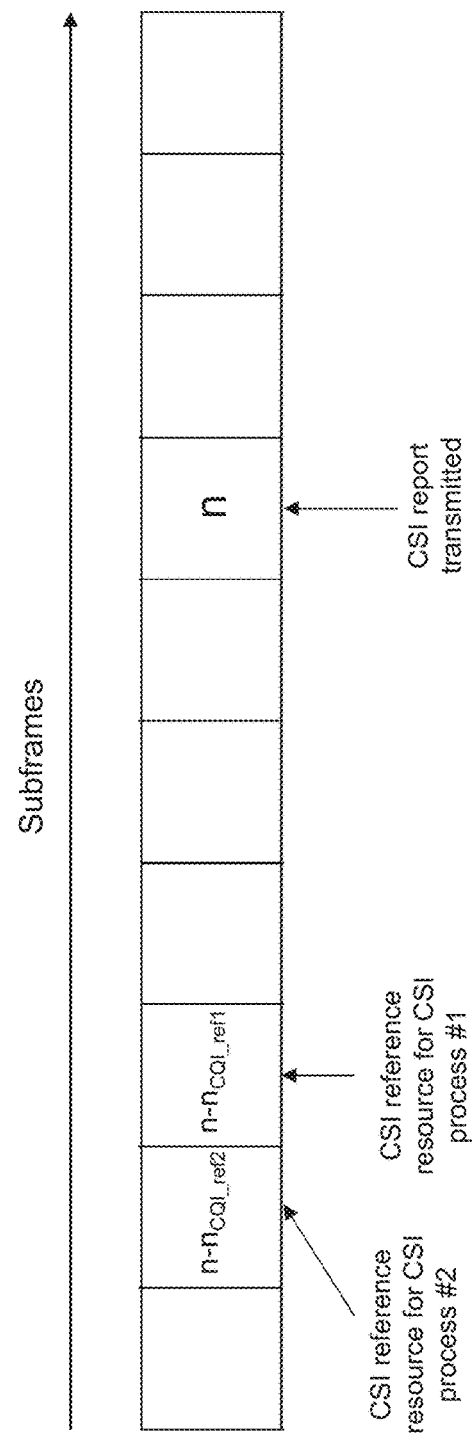
FIG. 8b is a signalling diagram of CSI reporting in accordance with one or more embodiments.

In some embodiments, the CSI reference resource is CSI-process-specific, see FIG. 8d. For example, the wireless device obtains or determines a different value $n_{CQI\_ref}$ for each CSI process, as exemplified in FIG. 8b.

In a particular variant, the wireless device receives information indicating the CSI reference resource for each CSI process from a network node. As a specific example, the wireless device receives a value $n_{CQI\_ref}$ for each CSI process from a network node, e.g. as part of downlink control information, or comprised in CSI process configuration information, or in a separate message, such as an RRC message. This allows the network node to prioritize between different CSI processes, or, stated differently, to control which CSI processes are processed first.

Another possibility is that the wireless device receives or determines a priority indication for each CSI process. As will be described below, the priority indication may be determined based on a causality between different CSI processes. For example, two CSI processes may be related such that the rank of the first CSI process can be reused for the second CSI process, in which case the first CSI process would have a higher priority (indicating that it should be processed before the second process). The CSI reference resource for each CSI process is then determined based on the priority.

FIGS. 8e-8f show corresponding embodiments in a network node.

The methods illustrated in FIGS. 8c-8f may be implemented in the network shown in FIG. 5.

Some embodiments provide a processing time window for a specific CSI report of a CSI process, wherein the length of the processing time window increases when the CSI reporting configuration corresponds to a computational complexity heavy configuration. For example, the processing time window may increase with an increased number of configured CSI processes and/or configured CSI-RSs. The processing time window may also be referred to as a "maximum CSI processing time" or "allowed CSI processing time".

Alternatively, the processing time window of a CSI report of a specific CSI process increases with the number of CSI reports that are associated with a higher priority than the specific CSI process.

The UE can then not be expected to update a CSI report based on new measurements, prior to said time window has passed after the corresponding measurement.

Figure 7:
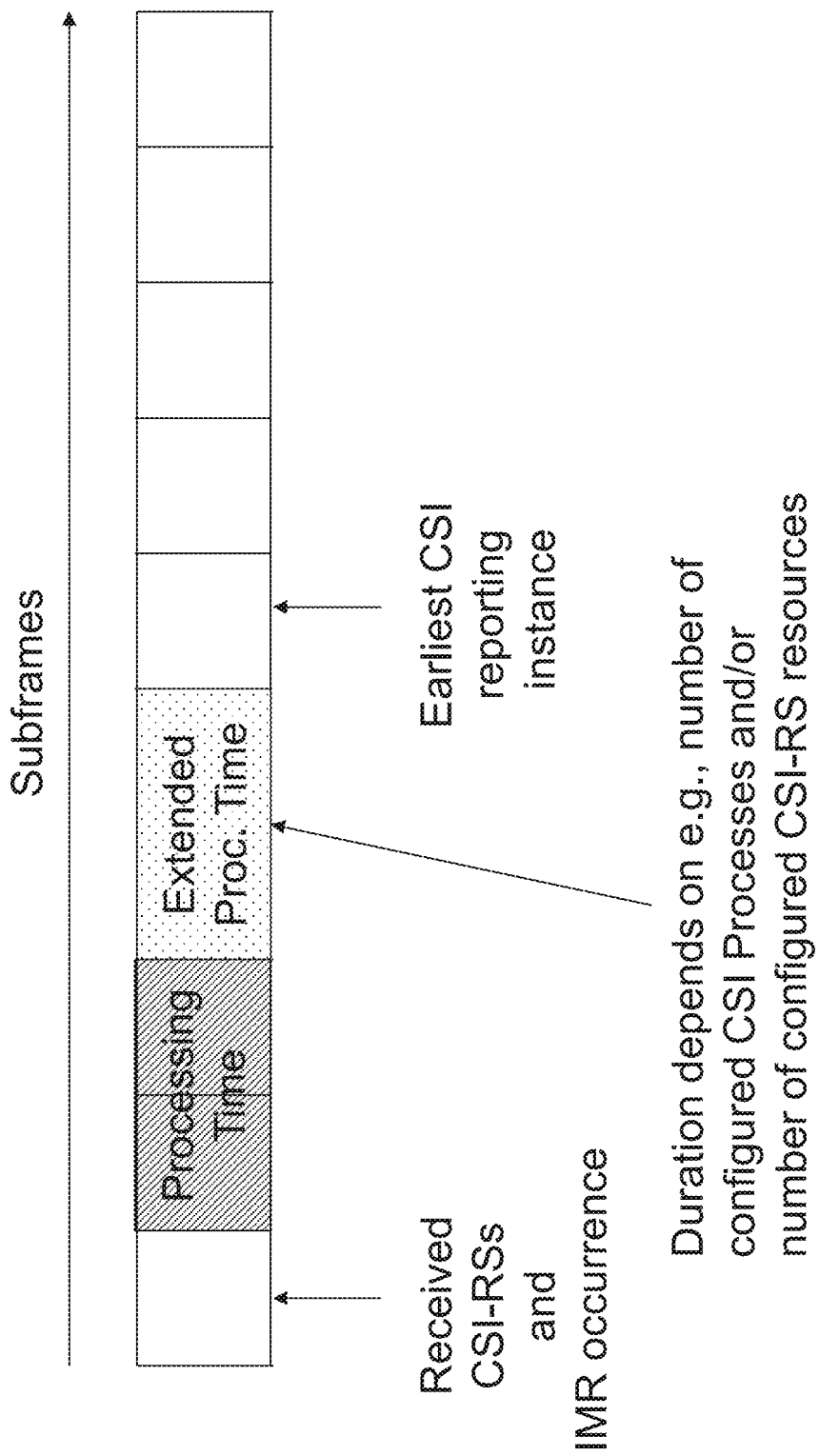
FIG. 7 is a signalling diagram of CSI reporting in accordance with one or more embodiments.

One embodiment of the invention is illustrated in FIG. 7. Here the total processing time, before a complete CSI report based on the measurements can be expected from the terminal, is extended. The duration of the extended processing time relates to the expected computational complexity of determining the CSI report(s) for the CSI processes. For example, it is a function of the number of configured CSI processes and/or the number of CSI-RSs configured. The extended processing time could, for example be standardized and determined from a look up table from known parameters.

In another embodiment, a specific processing time window can be determined for a specific CSI process, so that a CSI report for said CSI process triggered after said specific processing time window is updated with the new measurements.

Such an embodiment is illustrated in FIG. 8, where the processing time window of CSI Process 1 is one subframe, the processing time window of CSI Process 2 is 2 subframes, and the processing time window of CSI Process 3 is 3 subframes. Hence, after 2 subframes a CSI report can only be expected to contain updated information for CSI Processes 1 and 2, whereas any information relating to CSI Process 3 cannot be expected to account for the new measurements. Only reports triggered after at least 3 subframes can be expected to be updated with new measurements for all CSI Processes.

In one embodiment a minimum processing capability of the terminal is mandated by the standard, in terms of the number of CSI Processes that it should be capable of determining in a specified timeframe. For example, it could be mandated that the terminal should be able to processes N CSI Processes in M subframes. For example, it could be mandated that a terminal shall be capable of determining a report for two CSI Processes in each subframe.

In a further embodiment, the UE is capable of processing more than the mandated minimums number of CSI Processes in a given subframe.

In one embodiment there is a prioritization between multiple CSI Processes identifying in which order the UE is expected to processes multiple configured CSI Processes.

In one embodiment the reporting prioritization is configurable by the network. In one such embodiment, each CSI Process is assigned a priority indicator that determines in which order the CSI Processes should be computed.

It should be noted that a particular interference measurement resource may be shared by multiple CSI processes, in which case the interference measurement only has to be performed once.

Similarly, the desired signal reference signal resource may be shared by multiple CSI processes, in which case the associated channel estimation only need to be performed once.

Also, a RI and/or a PMI, may be determined as part of a first CSI process (assuming the associated desired effective channel and interference measurement) and reused also in a second CSI process. In this case, the PMI and RI do not involve any processing in the determining of the second CSI process. However, the CQI of the second CSI process should be determined using the interference measurements, and desired signal reference signals, of the second CSI process.

In one such embodiment, the prioritization is such that said first CSI process is prioritized over, implying that it should be processed prior to, said second CSI process. In a further embodiment, it is mandated by the standard that the first CSI process is prioritized over the second CSI process.

This has the advantage that UE may exploit that the reporting of the CSI processes is aligned with the causality of the dependencies of the CSI processes; that is, for the processing of the second CSI processes, the assumed the RI and/or PMI are available, since they were already determined as part of the reporting for the first CSI process.

An advantage of some embodiments is that the required peak processing capability of a UE can be reduced, while maintaining acceptable support also for large CoMP feedback configurations.

Figure 9:
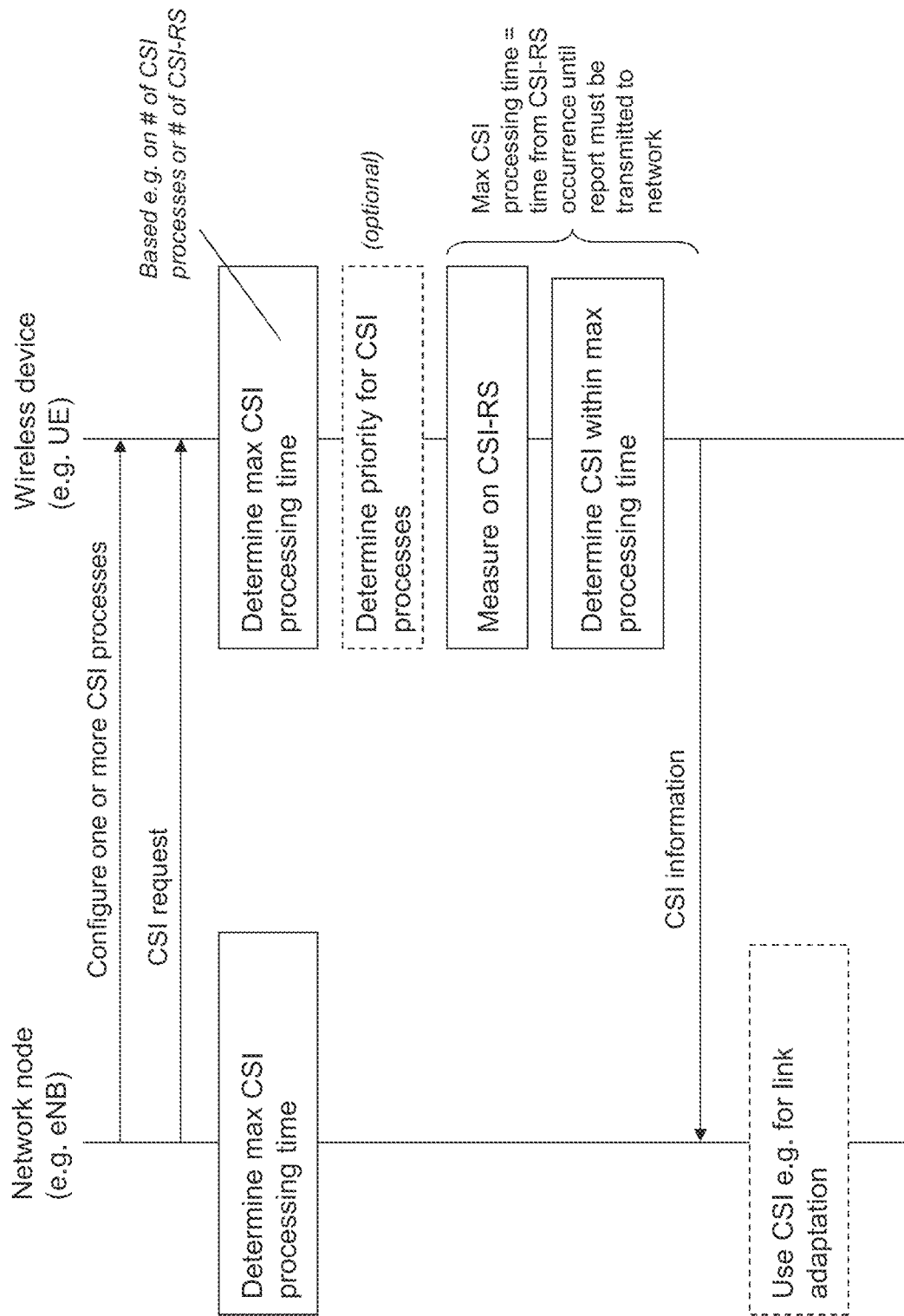
FIG. 9 is a signalling diagram between a network node and a wireless device of one or more embodiments.

FIG. 9 is a combined signaling diagram and flowchart illustrating the interaction between a network node and a wireless device in some embodiments.

FIGS. 10-12 illustrate methods in a wireless device according to some embodiments.

Referring to FIG. 10, a method is provided in a wireless device for reporting channel state information, CSI, to a network node. This method may be implemented in the wireless network shown in FIG. 5.

The wireless device receives a CSI process configuration for one or more CSI processes from the network node. Each CSI process corresponds to a reference signal resource and an interference measurement resource. The reference signal resource comprises a set of resource elements in which one or more reference signals corresponding to a desired signal are received. "Desired signal" in this context means a signal intended for reception by the wireless device. The interference measurement resource comprises a set of resource elements in which one or more signals assumed to be interfering with the desired signal are received. In particular embodiments the reference signal resource is a CSI-RS resource. However, the reference signal resource may be any other type of RS resource which may be used to estimate a desired signal, e.g. a CRS resource.

The wireless device further receives a request for CSI information from the network node. The CSI request may e.g. be comprised in downlink control information (DCI) in the form of a flag, or it may be comprised in a higher-layer message e.g. an RRC message. The CSI request may be a request for an aperiodic, or a periodic CSI report.

The wireless device determines a maximum CSI processing time based e.g. on the number of configured CSI processes or the number of configured CSI-RS resources. The maximum CSI processing time may also be referred to as an "allowed CSI processing time". In a variant, the maximum CSI processing time is CSI-process-specific, i.e. each CSI process is associated with a maximum CSI processing time.

The wireless device performs measurements based on one or more reference signals received in the reference signal resource for each configured CSI process, e.g. based on one or more CSI-RS. Depending on the CSI process configuration for the wireless device, some or all of the reference signal resources may be received in the same subframe. In addition, the wireless device estimates interference e.g. based on measurements on an IMR, as described above.

The wireless device then determines CSI information for each configured CSI process, within the allowed CSI processing time. In the variant where each CSI process is associated with a maximum CSI processing time, the wireless device will determine CSI information for each configured CSI process within the maximum processing time for that process. Thus, in this variant, the wireless device may start by determining CSI information for the processes that have the shortest maximum processing time, to ensure that the timing restrictions can be met.

Finally, the wireless device transmits CSI to the network node. Such a transmission can be requested by the network in an aperiodic CSI request (scheduled in a DCI block) or it could be scheduled to occur periodically in specific subframes.

FIG. 11 illustrates a similar embodiment, but in the method of FIG. 11 the wireless device also determines a priority order for the configured CSI processes, and determines CSI information for each CSI process according to the priority order. The prioritization may involve identifying a causal relationship between certain CSI processes, wherein one or more CSI values from one process can be reused for another process, as was described above.

FIG. 12 is a further variant of the method in FIG. 11. Here, the wireless device also determines a priority order, and determines CSI for the process with the highest priority within the maximum processing time (as shown in FIG. 8). In a variant, an indication of the priority order may be received from the network. For example, the wireless may receive, as part of the CSI process configuration, a priority indicator or index for each CSI process.

If the wireless device cannot determine CSIs for all CSI processes within the maximum processing time, the remaining CSI information will be based on previous measurements.

It should be noted that the network node has performed the corresponding prioritization (and optionally communicated this prioritization of CSI processes to the wireless device) and therefore knows which CSI processes it should expect to be updated within the maximum processing time, and which CSI processes are expected to be outdated.

FIG. 13 illustrates a method in a network node for CSI reporting.

The network node, e.g. an eNodeB, transmits, to a wireless device, e.g. an UE, a CSI process configuration for one or more CSI processes. Each CSI process corresponds to a reference signal resource and an interference measurement resource. The reference signal resource comprises a set of resource elements in which one or more reference signals corresponding to a desired signal are received. "Desired signal" in this context means a signal intended for reception by the wireless device. The interference measurement resource comprises a set of resource elements in which one or more signals assumed to be interfering with the desired signal are received. In particular embodiments the reference signal resource is a CSI-RS resource. However, the reference signal resource may be any other type of RS resource which may be used to estimate a desired signal, e.g. a CRS resource.

The network node further transmits a request for CSI information to the wireless device. The CSI request may e.g. be comprised in downlink control information (DCI) in the form of a flag, or it may be comprised in a higher-layer message e.g. an RRC message. The CSI request may be a request for an aperiodic, or a periodic CSI report.

The network node further determines a maximum CSI processing time based e.g. on the number of configured CSI processes or the number of configured CSI-RS resources. In a variant, the maximum CSI processing time is CSI-process-specific, i.e. each CSI process is associated with a maximum CSI processing time.

Optionally, the network node also determines a priority order for the CSI processes. As described above, the priority order may be determined based on a causality relationship between CSI processes.

The network node receives CSI information corresponding to the CSI processes from the wireless device, within the maximum CSI processing time. In the variant where a priority order is determined, the network node may receive CSI information for some CSI processes (having a higher priority) within the maximum processing time, and receive the remaining CSI information at a later point in time.

Optionally, the network node performs link adaptation and/or makes a scheduling decision based on the received CSI.

Figure 16:
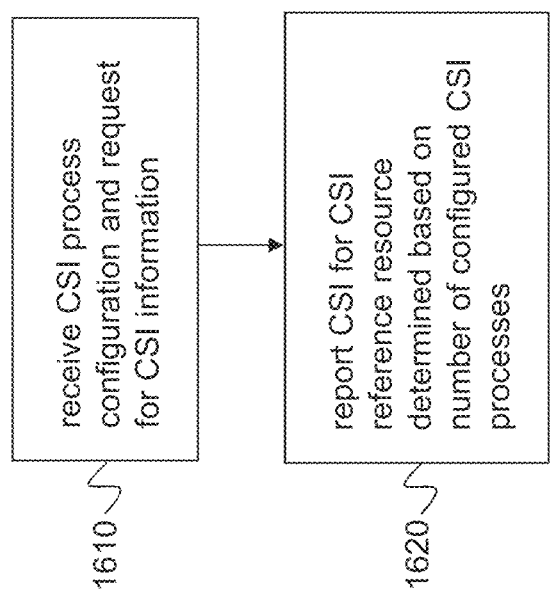
FIG. 16 is a flowchart of a method in a wireless device of reporting CSI in accordance with one or more embodiments.

Referring to FIG. 16, according to some embodiments a method is provided in a wireless device for reporting channel state information, CSI. This method may be implemented in the wireless device 540 shown in FIG. 5. The wireless device is comprised in a wireless network, e.g. wireless communications system 500 of FIG. 5. In some variants, the wireless device is a user equipment, UE.

The wireless device receives 1610 a CSI process configuration and a request for CSI information from a network node 560. The request for CSI information may be a request for a periodic CSI report, or a request for an aperiodic CSI report. The wireless device then reports 1620 CSI for one or more CSI processes, wherein the CSI is determined such as to reflect the state of the channel for a CSI reference resource. The CSI reference resource is determined based on the number of configured CSI processes. Optionally, the CSI reference resource is also determined based on the number of configured CSI-RS resources.

The wireless device may determine CSI based on measurements performed on reference signal resources corresponding to the configured CSI processes. In a particular variant, the CSI is determined based on measurements performed in and/or prior to the CSI reference resource. As described above, determining the CSI may further comprise performing measurements on interference measurement resources corresponding to the configured CSI processes, and determine the CSI based on these measurements.

In some variants, the wireless device determines a number $n_{CQI\_ref}$ representing the location of the CSI reference resource relative to the subframe in which the CSI report is transmitted. The wireless device may determine one number $n_{CQI\_ref}$ which is applied to all CSI processes configured for the device. Alternatively, different numbers $n_{CQI\_ref}$ may be determined for different CSI processes. In some variants, the number $n_{CQI\_ref}$ increases when the number of configured CSI processes exceeds a certain threshold. In another variant, $n_{CQI\_ref}$ increases with the number of configured CSI processes.

Optionally, the wireless device prioritizes a first CSI process over a second CSI process, e.g. based on a CSI process index or identity. The wireless device then determines a rank indicator and/or a precoding matrix indicator for the first CSI process, and reuses the determined rank indicator and/or precoding matrix indicator for the second CSI process.

Although the described solutions may be implemented in any appropriate type of telecommunication system supporting any suitable communication standards and using any suitable components, particular embodiments of the described solutions may be implemented in an LTE network, such as that illustrated in FIG. 5.

As shown in FIG. 5, the example network may include one or more instances of user equipment (UEs) and one or more base stations capable of communicating with these UEs, along with any additional elements suitable to support communication between UEs or between a UE and another communication device (such as a landline telephone). Although the illustrated UEs may represent communication devices that include any suitable combination of hardware and/or software, these UEs may, in particular embodiments, represent devices such as the example UE illustrated in greater detail by FIG. 15. Similarly, although the illustrated base stations may represent network nodes that include any suitable combination of hardware and/or software, these base stations may, in particular embodiments, represent devices such as the example base station illustrated in greater detail by FIG. 14.

Figure 15:
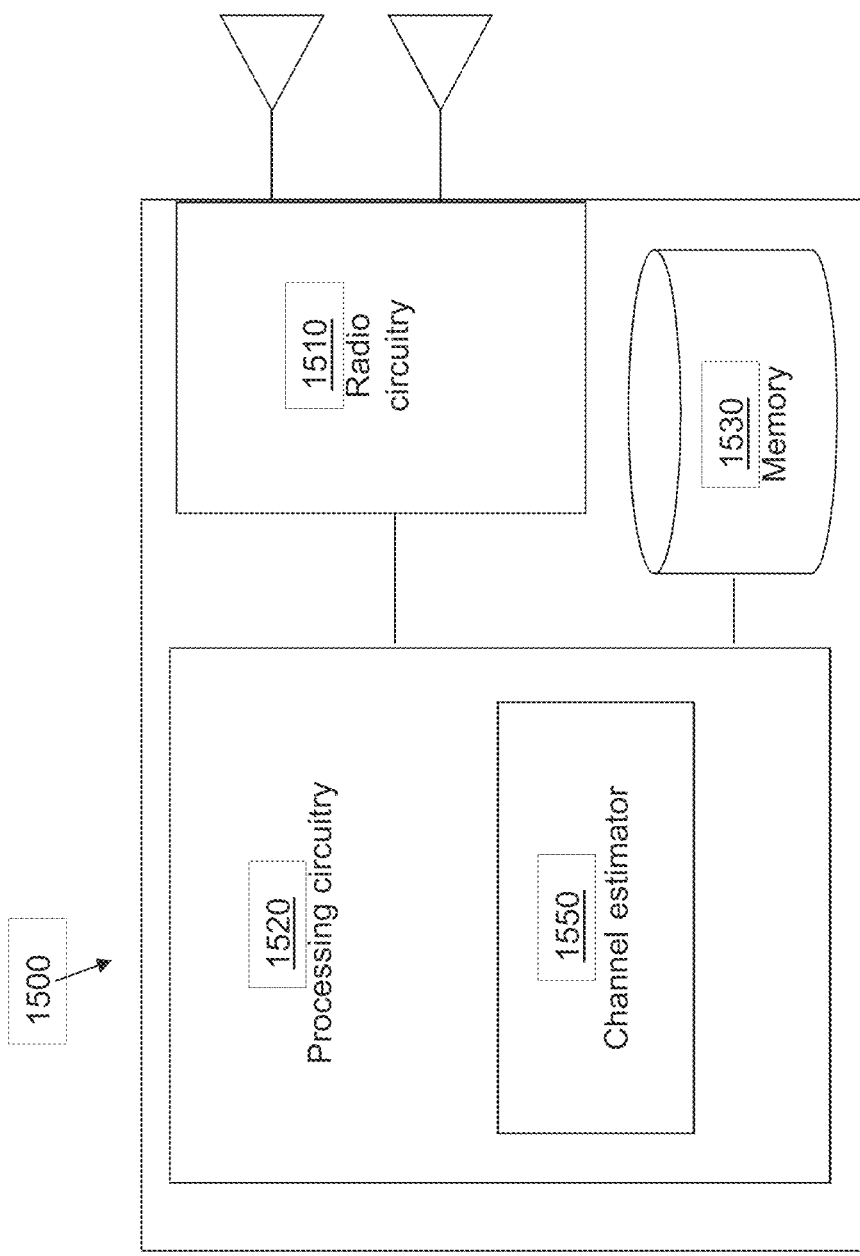
FIG. 15 is a block diagram illustrating a wireless device in accordance with one or more embodiments.

With reference to FIG. 15, some embodiments provide a wireless device 1500 for reporting Channel State Information, CSI. The wireless device may be a user equipment. The wireless device is adapted to receive a CSI process configuration and a request for CSI information from a network node, and to report CSI for one or more CSI processes. The CSI is determined such as to reflect the state of the channel for a CSI reference resource, and the CSI reference resource is determined based on the number of configured CSI processes.

Optionally, the wireless device is adapted to determine the CSI reference resource also based on the number of configured CSI-RS resources.

The wireless device may further be adapted to determine CSI based on measurements performed on reference signal resources corresponding to the configured CSI processes. In a particular variant, the wireless device is adapted to determine CSI based on measurements performed in and/or prior to the CSI reference resource. The wireless device may be further adapted to determine the CSI by performing measurements on interference measurement resources corresponding to the configured CSI processes, and determine the CSI based on these measurements.

In some variants, the wireless device is adapted to determine a number $n_{CQI\_ref}$ representing the location of the CSI reference resource relative to the subframe in which the CSI report is transmitted. The wireless device may further be adapted to determine one number $n_{CQI\_ref}$ which is applied to all CSI processes configured for the device. Alternatively, the wireless device may be adapted to determine different numbers $n_{CQI\_ref}$ for different CSI processes. In some variants, the wireless device is adapted to determine the number $n_{CQI\_ref}$ such that it increases when the number of configured CSI processes exceeds a certain threshold. In another variant, the wireless device is adapted to determine the number $n_{CQI\_ref}$ such that it increases with the number of configured CSI processes.

Optionally, the wireless device is adapted to prioritize a first CSI process over a second CSI process, e.g. based on a CSI process index or identity. The wireless device is then further adapted to determine a rank indicator and/or a precoding matrix indicator for the first CSI process, and to reuse the determined rank indicator and/or precoding matrix indicator for the second CSI process.

Referring again to FIG. 15, some embodiments provide a user equipment 1500 for reporting Channel State Information, CSI, the user equipment 1500 comprising a processor 1520 and a memory 1530, the memory 1530 comprising instructions executable by said processor whereby said user equipment 1500 is operative to receive a CSI process configuration and a request for CSI information from a network node, and to report CSI for one or more CSI processes, wherein the CSI is determined such as to reflect the state of the channel for a CSI reference resource, and the CSI reference resource is determined based on the number of configured CSI processes.

Optionally, the instructions, when executed, cause the user equipment 1500 to be operative to determine the CSI reference resource also based on the number of configured CSI-RS resources.

In some embodiments the instructions, when executed, cause the user equipment 1500 to be operative to determine CSI based on measurements performed on reference signal resources corresponding to the configured CSI processes. In a particular variant, the wireless device is caused to be operative to determine CSI based on measurements performed in and/or prior to the CSI reference resource. The wireless device may be further caused to be operative to determine the CSI by performing measurements on interference measurement resources corresponding to the configured CSI processes, and determine the CSI based on these measurements.

In some variants, the instructions, when executed, cause the user equipment 1500 to be operative to determine a number $n_{CQI\_ref}$ representing the location of the CSI reference resource relative to the subframe in which the CSI report is transmitted. The wireless device may further be caused to be operative to determine one number $n_{CQI\_ref}$ which is applied to all CSI processes configured for the device. Alternatively, the wireless device may be caused to be operative to determine different numbers $n_{CQI\_ref}$ for different CSI processes. In some variants, the wireless device is caused to be operative to determine the number $n_{CQI\_ref}$ such that it increases when the number of configured CSI processes exceeds a certain threshold. In another variant, the wireless device is caused to be operative to determine the number $n_{CQI\_ref}$ such that it increases with the number of configured CSI processes.

Optionally the instructions, when executed, cause the user equipment 1500 to be operative to prioritize a first CSI process over a second CSI process, e.g. based on a CSI process index or identity. The wireless device is then further operative to determine a rank indicator and/or a precoding matrix indicator for the first CSI process, and to reuse the determined rank indicator and/or precoding matrix indicator for the second CSI process.

As shown in FIG. 15, the example UE includes a processor, a memory, a transceiver, and an antenna. In particular embodiments, some or all of the functionality described above as being provided by mobile communication devices or other forms of UE may be provided by the UE processor executing instructions stored on a computer-readable medium, such as the memory shown in FIG. 15. Alternative embodiments of the UE may include additional components beyond those shown in FIG. 15 that may be responsible for providing certain aspects of the UE's functionality, including any of the functionality described above and/or any functionality necessary to support the solution described above.

Figure 14:
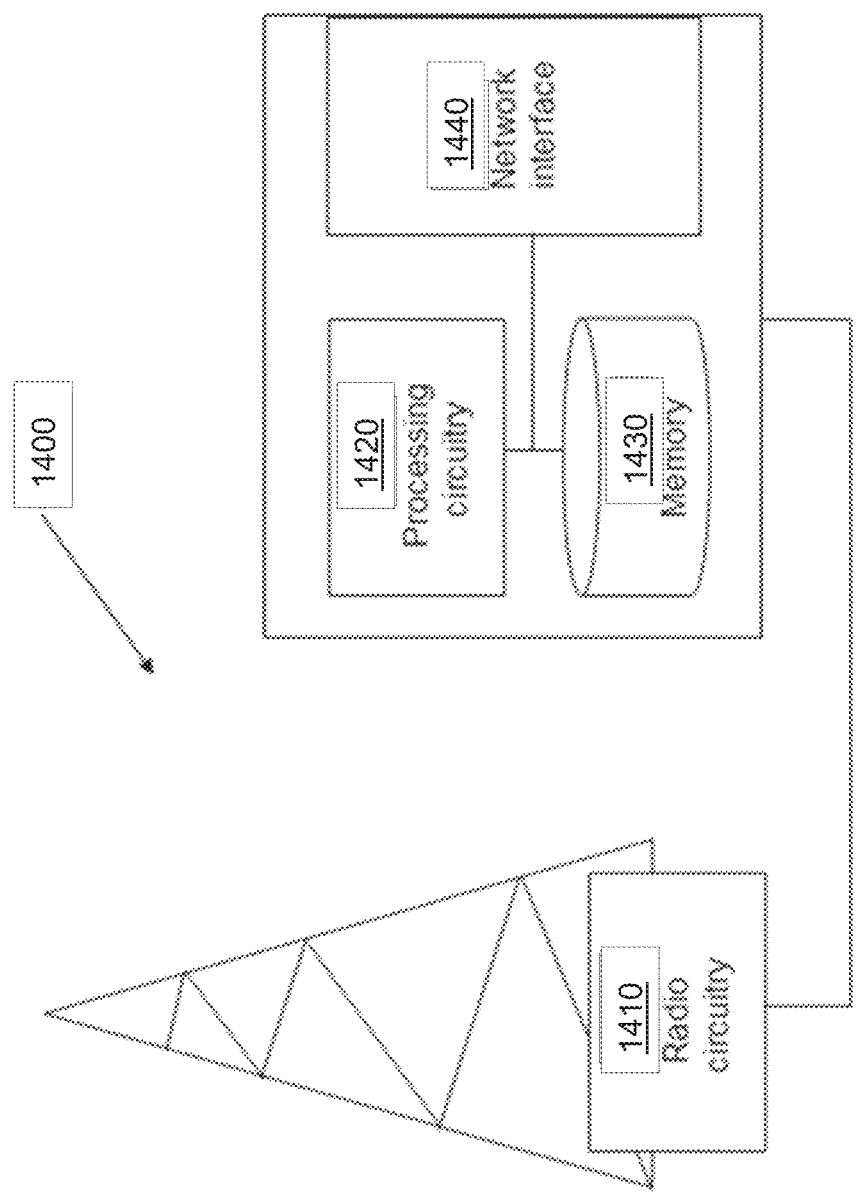
FIG. 14 is a block diagram illustrating a network node in accordance with one or more embodiments.

As shown in FIG. 14, the example base station includes a processor, a memory, a transceiver, and an antenna. In particular embodiments, some or all of the functionality described above as being provided by a mobile base station, a base station controller, a node B, an enhanced node B, and/or any other type of mobile communications node may be provided by the base station processor executing instructions stored on a computer-readable medium, such as the memory shown in FIG. 14. Alternative embodiments of the base station may include additional components responsible for providing additional functionality, including any of the functionality identified above and/or any functionality necessary to support the solution described above.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method, in a wireless device, for reporting Channel State Information (CSI), the wireless device being comprised in a wireless communications system, the method comprising:
   receiving a CSI process configuration and a request for CSI from a network node;
   determining a CSI reference resource based on a numerical indicator indicating a total number of configured CSI processes; and
   reporting CSI for one or more CSI processes, wherein the CSI reflects a state of a channel for the CSI reference resource; wherein determining the CSI reference resource comprises determining, as a function of how many CSI processes are configured for the wireless device, a location of the CSI reference resource.

2. The method of claim 1, wherein the determining the CSI reference resource comprises determining the CSI reference resource further based on a total number of configured CSI-RS resources configured for the wireless device.

3. The method of claim 1, further comprising:
   prioritizing a first CSI process over a second CSI process;
   determining a rank indicator and/or a precoding matrix indicator for the first CSI process; and
   reusing the determined rank indicator and/or precoding matrix indicator for the second CSI process.

4. The method of claim 1, further comprising:
   performing measurements on reference signal resources corresponding to the configured CSI processes; and
   determining the CSI based on the measurements.

5. The method of claim 1, wherein the CSI is determined based on measurements performed in and/or prior to the CSI reference resource.

6. The method of claim 1, wherein the request for CSI is a request for a periodic CSI report.

7. The method of claim 1, wherein the request for CSI is a request for an aperiodic CSI report.

8. The method of claim 1, further comprising:
   performing measurements on interference measurement resources corresponding to the configured CSI processes; and
   determining the CSI based on the measurements.

9. The method of claim 1, wherein each CSI process corresponds to a reference signal resource and an interference measurement resource.

10. A wireless device for reporting Channel State Information (CSI), the wireless device comprising:
    memory comprising instructions; and processing circuitry operatively connected to the memory and configured, when executing the instructions, to cause the wireless device to: receive, from a network node, a CSI process configuration and a request for CSI; determine a CSI reference resource based on a numerical indicator indicating a total number of configured CSI processes; and report CSI for one or more CSI processes, wherein the CSI reflects a state of a channel for the CSI reference resource; wherein determining the CSI reference resource comprises determining, as a function of how many CSI processes are configured for the wireless device, a location of the CSI reference resource.

11. The wireless device of claim 10, wherein the wireless device is a user equipment.

12. The wireless device of claim 10, wherein the processing circuitry, when executing the instructions, is further configured to determine the CSI reference resource further based on a total number of configured CSI-RS resources configured for the wireless device.

13. The wireless device of claim 10, wherein the processing circuitry, when executing the instructions, is further configured to:
    prioritize a first CSI process over a second CSI process;
    determine a rank indicator and/or a precoding matrix indicator for the first CSI process; and
    reuse the determined rank indicator and/or precoding matrix indicator for the second CSI process.

14. The wireless device of claim 10, wherein the processing circuitry, when executing the instructions, is further configured to:
    perform measurements on reference signal resources corresponding to the configured CSI processes; and
    determine the CSI based on the measurements.

15. The wireless device of claim 10, wherein the processing circuitry, when executing the instructions, is further configured to determine the CSI based on measurements performed in and/or prior to the CSI reference resource.

16. The wireless device of claim 10, wherein the processing circuitry, when executing the instructions, is further configured to:
  perform measurements on interference measurement resources corresponding to the configured CSI processes; and
  determine the CSI based on the measurements.

17. A computer program product stored on a non-transitory, computer readable medium and comprising program instructions, which when executed by at least one processor, causes the at least one processor to:
  receive, from a network node, a CSI process configuration and a request for CSI;
  determine a CSI reference resource based on a numerical indicator indicating a total number of configured CSI processes; and
  report CSI for one or more CSI processes, wherein the CSI reflects a state of a channel for the CSI reference resource; wherein determining the CSI reference resource comprises determining, as a function of how many CSI processes are configured for the wireless device, a location of the CSI reference resource.

18. The wireless device of claim 10, wherein the processing circuitry is operatively connected to the memory and is configured, when executing the instructions, to cause the wireless device to determine, as a function of how many CSI processes are configured for the wireless device, a location of the CSI reference resource.

19. The method of claim 1, wherein the reporting CSI comprises transmitting the CSI report in a given subframe; and
  wherein the determining a CSI reference resource comprises determining, based on the numerical indicator indicating a total number of configured CSI processes.

* * * * *